(12) United States Patent
Jiang et al.

(10) Patent No.: US 8,153,296 B2
(45) Date of Patent: Apr. 10, 2012

(54) LITHIUM CELL WITH CATHODE CONTAINING METAL DOPED IRON SULFIDE

(75) Inventors: Zhiping Jiang, Westford, MA (US); Rimma Sirotina, Ashland, MA (US); Nikolay Iltchev, Norfolk, MA (US)

(73) Assignee: The Gillette Company, Boston, MA (US)

( * ) Notice: Subject to any disclaimer, the term of this patent is extended or adjusted under 35 U.S.C. 154(b) by 824 days.

(21) Appl. No.: 12/229,840

(22) Filed: Aug. 27, 2008

(65) Prior Publication Data
US 2010/0055574 A1 Mar. 4, 2010

(51) Int. Cl.
*H01M 4/136* (2010.01)
*H01M 4/58* (2010.01)
*C01G 49/12* (2006.01)

(52) U.S. Cl. ........ 429/221; 429/220; 429/223; 429/224; 423/511

(58) Field of Classification Search .............. 429/220, 429/221, 223, 224; 423/511, 561.1
See application file for complete search history.

(56) References Cited

U.S. PATENT DOCUMENTS

| | | | |
|---|---|---|---|
| 3,992,222 A | 11/1976 | Walsh | |
| 4,794,057 A | 12/1988 | Griffin | |
| 4,952,330 A | 8/1990 | Leger | |
| 4,959,281 A | 9/1990 | Nishi | |
| 5,229,227 A | 7/1993 | Webber | |
| 5,290,414 A | 3/1994 | Marple | |
| 5,432,030 A | 7/1995 | Vourlis | |
| 5,514,491 A | 5/1996 | Webber | |
| 5,698,176 A | 12/1997 | Capparella | |
| 5,958,846 A * | 9/1999 | Geringer | 423/511 X |
| 6,218,054 B1 | 4/2001 | Webber | |
| 6,280,883 B1 | 8/2001 | Lamanna | |
| 6,849,360 B2 | 2/2005 | Marple | |
| 6,866,965 B2 | 3/2005 | Lee | |
| 6,906,235 B2 * | 6/2005 | Funakoshi et al. | 423/511 X |
| 7,157,185 B2 | 1/2007 | Marple | |
| 2005/0233214 A1 | 10/2005 | Marple | |
| 2005/0244706 A1 | 11/2005 | Wu | |
| 2005/0277023 A1 | 12/2005 | Marple | |
| 2006/0019161 A1 | 1/2006 | Issaev | |
| 2006/0046152 A1 | 3/2006 | Webber | |
| 2006/0046153 A1 | 3/2006 | Webber | |
| 2006/0046154 A1 | 3/2006 | Webber | |
| 2006/0228620 A1 | 10/2006 | Martinson | |
| 2007/0202409 A1 | 8/2007 | Yamakawa | |
| 2008/0026296 A1 | 1/2008 | Bowden | |
| 2008/0050654 A1 | 2/2008 | Stevanovic | |
| 2008/0076029 A1 | 3/2008 | Bowden et al. | |

FOREIGN PATENT DOCUMENTS

JP 57152673 A 9/1982

OTHER PUBLICATIONS

PCT International Search Report with Written Opinion in corresponding Int'l appln. PCT/US2009/054715 dated Dec. 4, 2009.
C.H. Ho, C.E. Huang, and C.C. Wu, "Preparation and Characterization of Ni-Incorporated $FeS_2$ Single Crystals", Journal of Crystal Growth, vol. 270 (2004), p. 535-541.
A. Awano, K. Haraguschi, and H. Yamasaki, "Li/Fe(1-x)Co(x)S(2) System Thermal Battery Performance", Proceedings of the International Power Sources Symposium, 35th (1992), p. 219-222.
Jae-Won Choi, et. al. "Effect of Metal Additives (Co and Ni) On The Electrochemical Properties of Lithium/$FeS_2$ Batteries", Materials Science Forum, vols. 544-545 (2007).

* cited by examiner

*Primary Examiner* — Stephen J. Kalafut
(74) *Attorney, Agent, or Firm* — Vladimir Vitenberg; Kevin C. Johnson; Barry D. Josephs

(57) ABSTRACT

A primary cell having an anode comprising lithium and a cathode comprising a metal doped iron sulfide and carbon particles. A cathode slurry is prepared comprising the metal doped iron sulfide powder, carbon, binder, and a liquid solvent. The mixture is coated onto a conductive substrate and solvent evaporated leaving a dry cathode coating on the substrate. The anode and cathode can be spirally wound with separator therebetween and inserted into the cell casing with electrolyte then added.

32 Claims, 6 Drawing Sheets

LITHIUM CELL WITH CATHODE CONTAINING METAL DOPED IRON SULFIDE

FIELD OF THE INVENTION

The invention relates to primary lithium cells having an anode comprising lithium or lithium alloy and a cathode comprising a metal doped iron sulfide of crystalline structure wherein the doping metal is desirably of nickel, copper, iron, or manganese.

BACKGROUND

Primary (non-rechargeable) electrochemical cells having an anode of lithium are known and are in commercial use. The anode is comprised essentially of lithium metal. Such cells typically have a cathode comprising manganese dioxide, and electrolyte comprising a lithium salt such as lithium trifluoromethane sulfonate ($LiCF_3SO_3$) dissolved in an organic solvent. The cells are referenced in the art as primary lithium cells (primary $Li/MnO_2$ cells) and are generally not intended to be rechargeable. Alternative, primary lithium cells with lithium metal anodes but having different cathodes, are also known. Such cells, for example, have cathodes comprising iron disulfide ($FeS_2$) and are designated $Li/FeS_2$ cells. The iron disulfide ($FeS_2$) is also known as pyrite. The $Li/MnO_2$ cells or $Li/FeS_2$ cells are typically in the form of cylindrical cells, typically AA size or AAA size cells, but may be in other size cylindrical cells. The $Li/MnO_2$ cells have a voltage of about 3.0 volts which is twice that of conventional $Zn/MnO_2$ alkaline cells and also have higher energy density (watt-hrs per $cm^3$ of cell volume) than that of alkaline cells. The $Li/FeS_2$ cells have a voltage (fresh) of between about 1.2 and 1.8 volts which is about the same as a conventional $Zn/MnO_2$ alkaline cell. However, the energy density (watt-hrs per $cm^3$ of cell volume) of the $Li/FeS_2$ cell is higher than a comparable size $Zn/MnO_2$ alkaline cell. The theoretical specific capacity of lithium metal is high at 3861.4 mAmp-hr/gram and the theoretical specific capacity of $FeS_2$ is 893.6 mAmp-hr/gram. The $FeS_2$ theoretical capacity is based on a 4 electron transfer from 4Li per $FeS_2$ molecule to result in reaction product of elemental iron Fe and $2Li_2S$. That is, 2 of the 4 electrons change the oxidation state of +2 for $Fe^{+2}$ in $FeS_2$ to 0 in elemental iron ($Fe^0$) and the remaining 2 electrons change the oxidation state of sulfur from −1 in $FeS_2$ to −2 in $Li_2S$.

Overall the $Li/FeS_2$ cell is much more powerful than the same size $Zn/MnO_2$ alkaline cell. That is for a given continuous current drain, particularly at higher current drain over 200 milliamp for an AA size cell, the voltage is flatter for longer periods for the $Li/FeS_2$ cell than the $Zn/MnO_2$ alkaline cell as may be evident in a voltage vs. time discharge profile. This results in a higher energy output obtainable from a $Li/FeS_2$ cell compared to that obtainable for a same size alkaline cell. The higher energy output of the $Li/FeS_2$ cell is more clearly and more directly shown in graphical plots of energy (Watt-hrs) versus continuous discharge at constant power (Watts) wherein fresh cells are discharged to completion at fixed continuous power outputs ranging from as little as 0.01 Watt to 5 Watt. In such tests the power drain is maintained at a constant continuous power output selected between 0.01 Watt and 5 Watt. (As the cell's voltage drops during discharge the load resistance is gradually decreased raising the current drain to maintain a fixed constant power output.) The graphical plot Energy (Watt-Hrs) versus Power Output (Watt) for the $Li/FeS_2$ cell is above that for the same size alkaline cell. This is despite that the starting voltage of both cells (fresh) is about the same, namely, between about 1.2 and 1.8 volt.

Thus, the $Li/FeS_2$ cell has the advantage over same size alkaline cells, for example, AAA, AA, C or D size or any other size cell in that the $Li/FeS_2$ cell may be used interchangeably with the conventional $Zn/MnO_2$ alkaline cell and will have greater service life, particularly for higher power demands. Similarly the $Li/FeS_2$ cell which is a primary (nonrechargeable) cell can also be used as a replacement for the same size rechargeable nickel metal hydride cell, which has about the same voltage (fresh) as the $Li/FeS_2$ cell. Thus, the primary $Li/FeS_2$ cell can be used to power digital cameras, which require operation at high pulsed power demands.

The cathode material for the $Li/FeS_2$ cell may be initially prepared in a form such as a slurry mixture (cathode slurry), which can be readily coated onto the metal substrate by conventional coating methods. The electrolyte added to the cell must be a suitable organic electrolyte for the $Li/FeS_2$ system allowing the necessary electrochemical reactions to occur efficiently over the range of high power output desired. The electrolyte must exhibit good ionic conductivity and also be sufficiently stable, that is non reactive, with the undischarged electrode materials (anode and cathode components) and also non-reactive with the discharge products. This is because undesirable oxidation/reduction reactions between the electrolyte and electrode materials (either discharged or undischarged) could thereby gradually contaminate the electrolyte and reduce its effectiveness or result in excessive gassing. This in turn can result in a catastrophic cell failure. Thus, the electrolyte used in $Li/FeS_2$ cell in addition to promoting the necessary electrochemical reactions, should also be stable to discharged and undischarged electrode materials. Additionally, the electrolyte should enable good ionic mobility and transport of the lithium ion ($Li^+$) from anode to cathode so that it can engage in the necessary reduction reaction resulting in $LiS_2$ product in the cathode.

An electrode composite is formed with a sheet of lithium, a sheet of cathode composite containing the $FeS_2$ active material and separator therebetween. The electrode composite may be spirally wound and inserted into the cell casing, for examples, as shown in U.S. Pat. No. 4,707,421. A cathode coating mixture for the $Li/FeS_2$ cell is described in U.S. Pat. No. 6,849,360. A portion of the anode sheet is typically electrically connected to the cell casing which forms the cell's negative terminal. The cell is closed with an end cap which is insulated from the casing. The cathode sheet can be electrically connected to the end cap which forms the cell's positive terminal. The casing is typically crimped over the peripheral edge of the end cap to seal the casing's open end. The cell may be fitted internally with a PTC (positive thermal coefficient) device or the like to shut down the cell in case the cell is exposed to abusive conditions such as short circuit discharge or overheating.

It would be desirable to improve the electrical conductivity of the cathode and to improve utilization (discharge efficiency of the cathode active material) in the $Li/FeS_2$ cell. Consequently, it would be desirable to modify the $FeS_2$ composition or its crystalline structure in order to produce a substitute, though related, material which has better electrical conductivity (lower resistivity) and demonstrates improved discharge characteristics compared to $FeS_2$.

In C. H. Ho, C. E. Huang, and C. C. Wu, "Preparation and Characterization of Ni-Incorporated $FeS_2$ Single Crystals", *Journal of Crystal Growth*, Vol. 270 (2004), p. 535-541 is disclosed nickel (Ni)-doped $FeS_2$ crystals. Nickel-incorporated single crystals with compositions $Fe_{0.99}S_2:Ni_{0.01}$, $Fe_{0.98}S_2:Ni_{0.02}$, $Fe_{0.96}S_2:Ni_{0.04}$, and $Fe_{0.9}S_2:Ni_{0.1}$ were grown by chemical vapor transport method (CVT) using $ICl_3$ as a transport agent. By means of the analysis of the X-ray diffraction patterns, the series of nickel-doped $FeS_2$ single crystals were determined to be single phase and isostructural. The conductivity measurements show the resistivity of the nickel-doped $FeS_2$ decreased as the doping concentration of the nickel increased. There are no actual tests reported in this reference employing the nickel-doped $FeS_2$ in batteries.

In A. Awano, K. Haraguchi, and H. Yamasaki, "Li/$Fe_{1-x}Co_xS_2$ System Thermal Battery Performance", *Proceedings of the International Power Sources Symposium*, 35$^{th}$ (1992), p. 219-222 is reported the evaluation of a synthetic iron-cobalt disulfide ($Fe_{1-x}Co_xS_2$) as cathode material in a high temperature (thermal) battery. A preferred material was $Fe_{1-x}Co_xS_2$ at x=0.15. (The atomic ratio of Fe to S is less than 0.5.) Such thermal batteries are rechargeable (secondary) batteries which operate at high temperature, e.g. at about 500° C., for example as in $FeS_2$ thermal battery reported in U.S. Pat. No. 3,992,222. The synthetic $Fe_{1-x}Co_xS_2$ cathode material was tested in a thermal battery having an anode which included lithium metal. The thermal battery was discharged at a test temperature of between about 450 to 600° C. It was concluded that the $Fe_{1-x}Co_xS_2$ cathode exhibited improved discharge utilization and could be useful in primary thermal batteries, which characteristically operate at high temperature.

In Jae-Won Choi, et. al., "Effect of Metal Additives (Co and Ni) On the Electrochemical Properties of Lithium/$FeS_2$ Batteries", Materials Science Forum, Vols. 544-545 (2007), p. 973-976 there is reported an investigation of the rechargeable (cycleability) properties of Li/$FeS_2$ cells with cathodes comprising $FeS_2$, with and without low percent by weight cobalt (Co) or nickel (Ni). The cathode active material was prepared by high energy mechanical alloying technique from a starting mixture of iron, sulfur, and cobalt or nickel additive forming an alloy material. This mixture was subjected to ball milling performed in an argon atmosphere at ambient temperature with zirconium milling balls to produce an alloy of $FeS_2$ and cobalt or nickel. It is not stated in this reference that the cobalt or nickel became incorporated into the crystalline structure of the $FeS_2$. The discharge tests were made employing a rechargeable coin cell. It is stated that the room temperature cycleability of a Li/$FeS_2$ cell had not shown good results for rechargeable batteries when the cathode active material was just $FeS_2$. The test cells containing $FeS_2$ and cobalt or FeS2 and nickel were subjected to charge/discharge cycles at room temperature as they were charged to 2.6V and discharged to 1.2V in each cycle for up to 5 cycles. The initial (first cycle) discharge capacity of a Li/$FeS_2$ test cell with $FeS_2$ cathodes containing 5 wt % cobalt or 3 wt % nickel were 571 mAmphr/g and 844 mAmphr/g respectively, compared to 389 mAmphr/g for the cathode with no metal additive. A principal objective was to try to improve the cycleability (rechargeable) characteristic of the Li/$FeS_2$ cell by adding cobalt or nickel to the $FeS_2$ cathode. The addition of cobalt or nickel to the $FeS_2$ by ball milling was reported to improve the discharge capacity of the $FeS_2$ cell attributed to the enhancement of electronic conductivity achieved by the addition of metallic material. The addition of cobalt as alloy to the $FeS_2$ is reported to show results suitable for better rechargeable cycle performance. The cobalt or nickel was added to the $FeS_2$ by ball milling (without heating at high temperature). There is no report or evidence presented to indicate whether the cobalt became incorporated into the $FeS_2$ crystalline structure.

In Japanese patent publication Yamada JP57152673A a coin shaped lithium battery is disclosed having a lithium anode disc and a cathode active material comprising a solid solution formed of $FeS_2$ and either copper (Cu) or zinc (Zn). The gram atom ratio of Cu/Fe may be 0.1/99.9 to 3.0/97.0 and the Zn/Fe gram atom ratio may be between 0.1/99.9 to 2.0/98. The solid solution containing $FeS_2$ and copper, for example, is formed by mixing $FeS_2$ powder with $Cu_2S$ (described in the working example) and heat treating the mixture in an atmosphere of nitrogen at 300° C. for 24 hours. There is no report of incorporation of the Cu into the $FeS_2$ crystalline structure or any changes to the $FeS_2$ crystalline structure or the nature of such changes. The lithium battery with the $FeS_2$ and Cu or Zn added tended to show better performance than same cell with only $FeS_2$ as cathode active material.

The electrolyte used in a primary Li/$FeS_2$ cells are formed of a "lithium salt" dissolved in an "organic solvent". Representative lithium salts which may be used in electrolytes for Li/$FeS_2$ primary cells are referenced in U.S. Pat. No. 5,290,414 and U.S. Pat. No. 6,849,360 B2 and include such salts as: Lithium trifluoromethanesulfonate, $LiCF_3SO_3$ (LiTFS); lithium bistrifluoromethylsulfonyl imide, $Li(CF_3SO_2)_2N$ (LiTFSI); lithium iodide, LiI; lithium bromide, LiBr; lithium tetrafluoroborate, $LiBF_4$; lithium hexafluorophosphate, $LiPF_6$; lithium hexafluoroarsenate, $LiAsF_6$; $Li(CF_3SO_2)_3C$, and various mixtures. In the art of Li/$FeS_2$ electrochemistry lithium salts are not always interchangeable as specific salts work best with specific electrolyte solvent mixtures.

In U.S. Pat. No. 5,290,414 (Marple) is reported use of a beneficial electrolyte for $FeS_2$ cells, wherein the electrolyte comprises a lithium salt dissolved in a solvent comprising 1,3-dioxolane (DX) in admixture with a second solvent which is an acyclic (non cyclic) ether based solvent. The acyclic (non cyclic) ether based solvent as referenced may be dimethoxyethane (DME), ethyl glyme, diglyme and triglyme, with the preferred being 1,2-dimethoxyethane (DME). As given in the example the dioxolane and 1,2-dimethoxyethane (DME) are present in the electrolyte in substantial amount, i.e., 50 vol % 1,3-dioxolane (DX) and 40 vol % dimethoxyethane (DME) or 25 vol % 1,3-dioxolane (DX) and 75 vol. % dimethoxyethane (DME) (col. 7, lines 47-54). A specific lithium salt ionizable in such solvent mixture(s), as given in the example, is lithium trifluoromethane sulfonate, $LiCF_3SO_3$. Another lithium salt, namely lithium bistrifluoromethylsulfonyl imide, $Li(CF_3SO_2)_2N$ is also mentioned at col. 7, line 18-19. The reference teaches that a third solvent may optionally be added selected from 3,5-dimethylisoxazole (DMI), 3-methyl-2-oxazolidone, propylene carbonate (PC), ethylene carbonate (EC), butylene carbonate (BC), tetrahydrofuran (THF), diethyl carbonate (DEC), ethylene glycol sulfite (EGS), dioxane, dimethyl sulfate (DMS), and sulfolane (claim 19), with the preferred being 3,5-dimethylisoxazole.

In U.S. Pat. No. 6,218,054 (Webber) is disclosed an electrolyte solvent system wherein dioxolane-based solvent and dimethoxyethane-based solvent are present in a weight ratio of about 1:3 (1 part by weight dioxolane to 3 parts by weight dimethoxyethane).

In U.S. Pat. No. 6,849,360 B2 (Marple) is disclosed an electrolyte for an Li/$FeS_2$ cell, wherein the electrolyte comprises the salt lithium iodide dissolved in the organic solvent mixture comprising 1,3-dioxolane (DX), 1,2-dimethoxyethane (DME), and small amount of 3,5dimethylisoxazole (DMI). (col. 6, lines 44-48.)

In US 2007/0202409 A1 (Yamakawa) it is stated with reference to the electrolyte solvent for the Li/$FeS_2$ cell at para. 33: "Examples of the organic solvent include propylene carbonate, ethylene carbonate, 1,2-dimethoxy ethane, γ-butyrolactone, tetrahydrofuran, 2-methyltetrahydrofuran, 1,3-dioxolane, sulfolane, acetonitrile, dimethyl carbonate, and dipropyl carbonate, and any one of them or two or more of them can be used independently, or in a form of a mixed solvent." Such statement is misleading, since the art teaches only specific combinations of electrolyte solvents will be workable for the Li/FeS$_2$ cell depending on the particular lithium salt to be dissolved in the solvent. (See, e.g. above U.S. Pat. No. 5,290,414 and U.S. Pat. No. 6,849,360) The reference Yamakawa does not teach which combination of solvents from the above list are to be used with any given lithium salt.

In U.S. 2006/0046152 (Webber) is disclosed an electrolyte system for a lithium cell which may have a cathode comprising FeS$_2$ and FeS therein. The disclosed electrolyte contains lithium iodide salt dissolved in a solvent system comprising a mixture of 1,2-dimethoxypropane and 1,2-dimethoxyethane.

The choice of a particular organic solvent or mixture of different organic solvents for use in conjunction with any one or more lithium salts to produce a suitable electrolyte for the Li/FeS$_2$ cell is challenging. This is not to say that many combinations of lithium salts and organic solvents do not produce a Li/FeS$_2$ cell which will not work at all. But rather the challenge associated with such cells using an electrolyte formed with just any combination of known lithium salt and organic solvent is that the problems encountered will likely be very substantial, thus making the cell impractical for commercial usage. The history of development of lithium cells in general, whether lithium primary cells, e.g. non rechargeable Li/MnO$_2$ or Li/FeS$_2$ cells or rechargeable lithium or lithium ion cells reveals that just any combination of lithium salt and organic solvent cannot be expected to result in a good cell, that is, exhibiting good, reliable performance. Thus, references which merely provide long lists of possible organic solvents for Li/FeS$_2$ cells do not necessarily teach combinations of solvents or combination of specific lithium salts in specific solvent mixtures, which exhibit particular or unexpected benefit.

It is desired to produce a primary (nonrechargeable) lithium battery that is reliable and has good rate capability for use under indoor and outdoor conditions.

It is desired to produce a primary (nonrechargeable) lithium cell having good rate capability that the cell may be used in place of rechargeable batteries to power digital cameras.

SUMMARY OF THE INVENTION

The invention is directed to lithium primary cells wherein the anode comprises lithium metal. The lithium may be alloyed with small amounts of other metal, for example aluminum, which typically comprises less than about 1 or 2 wt. % of the lithium alloy. The lithium which forms the anode active material, is preferably in the form of a thin foil. An important type of lithium primary cell has a cathode comprising iron disulfide (FeS$_2$), commonly known as "pyrite" as the cathode active material.

In a principal aspect of the invention it has been determined that iron disulfide (FeS$_2$), which has been used as cathode active material for the lithium cell, can be modified by incorporating into its crystalline structure relatively small amounts of certain metals, for example, nickel, copper, manganese, and iron. This changes the composition of FeS$_2$ and incorporates the metal into the iron sulfide crystalline structure. The metal becomes doped (incorporated) into the iron sulfide crystalline structure. The metal is held chemically bonded within the iron sulfide crystalline structure, thereby producing a metal doped iron sulfide, which is a fundamentally modified material compared to iron disulfide (FeS$_2$). Thus the term "metal doped" as used herein shall be understood to mean that a metal M has been incorporated into a product crystalline structure and is held therein by chemical bonding. This distinguishes the metal doped iron sulfide product of the invention from simple mixtures of iron disulfide (FeS$_2$) and metal or from mixtures of iron sulfide (FeS) and metal.

It has been determined that the metal doped iron sulfide product of the invention can be used as cathode active material in the primary lithium cell to result in longer discharge service. To achieve such improved cell performance the doping metal is preferably selected from nickel or copper, but may also be selected from manganese or iron. In fact it has been determined that all of the FeS$_2$ which is normally employed as cathode active material in the primary lithium cell can be replaced with the metal doped iron sulfide product of the invention. However, it will be appreciated that it is within the present invention to replace only a portion of the FeS$_2$ normally employed in the Li/FeS$_2$ cell with the metal doped iron sulfide product. Improved discharge performance of the lithium cell, particularly in high power service as in powering a digital camera, can be achieved by substituting all of the FeS$_2$ normally used in the cathode, with the metal doped iron sulfide product of the invention.

The improved cathode active material of the invention can be prepared directly from FeS$_2$ by heating a reaction mixture comprising FeS$_2$ powder in admixture with the desired metal powder in a protected environment utilizing an inert gas. A preferred inert gas is argon, which adequately protects the mixture from air during the heating process. Other inert gasses or high partial vacuum may be used to achieve the objective of protecting the reaction mixture from exposure of air or other atmospheric contaminants during the heating process. Although it may be possible to accomplish heating the reaction mixture in a high partial vacuum of air, better protection against contamination from air is afforded by heating the reaction mixture in an inert atmosphere, preferably of argon gas. The mixture of FeS$_2$ powder and metal powder, for example a mixture of FeS$_2$ and nickel powder or FeS$_2$ and copper powder, is desirably heated in such protected environment at a temperature between about 400 and 550° C., for a period of at least about 1 hour, typically between about 3 and 7 hours. Preferably the mixture of FeS$_2$ and nickel powder or FeS$_2$ and copper powder is heated between about 425 to 500° C. for a period desirably between about 3 and 7 hours. Desirably the FeS$_2$ and metal powder reactants are supplied in molar ratio of FeS$_2$ to metal M between about 0.99:0.01 to 0.9:0.1. Thus, the metal M is present in mole fraction x in the reactant mixture of FeS$_2$ and M, wherein x is between 0.01 and 0.1, or may be equal to 0.01 or 0.1. More typically, x may be between about 0.01 and 0.08, for example, between about 0.01 and 0.06. The following reaction occurs resulting in the metal doped iron sulfide crystalline product Fe$_{(1-x)}$M$_x$S$_{(2-2x)}$ having the metal M incorporated therein, wherein the mole ratio of Fe to M is
(1-x)/x as follows:

$$(1-x)\text{FeS}_2 + x\text{M} \rightarrow \text{Fe}_{(1-x)}\text{M}_x\text{S}_{(2-2x)} \quad \text{(Eq. 1)}$$

wherein,
x is between 0.01 and 0.1 or may equal 0.01 or 0.1
M is preferably nickel or copper, but may also be selected from manganese or iron.

It will be appreciated that the product formula Fe$_{(1-x)}$M$_x$S$_{(2-2x)}$ may be normalized to sulfur content S$_2$ by dividing by (1-x) and thus presented as FeM$_{x/(1-x)}$S$_2$, which is an equivalent formula.

Samples of the Fe$_{(1-x)}$M$_x$S$_{(2-2x)}$ metal doped iron sulfide crystalline product may be conveniently prepared by simply placing a mixture of $FeS_2$ powder and metal powder in a small open boat shaped container composed of ceramic material such as alumina oxide. As above indicated the preferred metal is nickel or copper, but the metal may also be selected from iron or manganese. The container with reactant mixture therein may be inserted into a ceramic heating tube which in turn is placed in an electric oven. The ends of the heating tube can penetrate out from the sides of the oven so that inert gas can be passed through the tube, typically at low flow rate, to protect the reactant mixture from exposure to air during the heating process. The reactant mixture of $FeS_2$ and metal powder M can be prepared according to the mole ratio of x moles M for every (1-x) moles $FeS_2$, for x between 0.01 and 0.1, wherein x may also be equal to 0.01 or 0.1. That is the mole fraction of metal (M) in the iron disulfide and metal reactant mixture is between 0.01 and 0.1, or equal to 0.01 or 0.1. The reactant mixture can be heated and maintained at a temperature of between about 425 and 500° C. for a period of between about 3 and 6 hours, which has been found to be adequate to produce the resulting desired metal doped $Fe_{(1-x)}M_xS_{(2-2x)}$ crystalline product.

An x-ray diffraction analysis of the resulting metal doped iron sulfide product sample reveals that there was no free metal phase left in the reaction mixture and the product has a crystalline structure similar (though not identical) to that of $FeS_2$. However, the x-ray peaks identifying the resultant product had shifted to lower angles away from the peaks expected for $FeS_2$, suggesting that all of the reactant metal, M, had become incorporated into the product crystalline structure and was held chemically bonded therein, forming a product of $Fe_{(1-x)}M_xS_{(2-2x)}$. This indicated a different product compared to $FeS_2$ even though the atomic ratio of Fe to S is 1:2. In addition, the resistivity of the metal doped iron sulfide product was excellent at between about 0.25 and 0.85 ohm-cm with nickel used as the dopant metal and between about 0.38 and 2.53 ohm-cm when copper was used as the dopant metal, compared with 4.45 and 8.79 ohm-cm observed from the physical mixtures of $FeS_2$ and metal particles.

In large scale production of the metal doped iron sulfide ($Fe_{(1-x)}M_xS_{(2-2x)}$) product the necessary heating of the $FeS_2$ and metal powder reactants could done in large batch operation while the reactant mixture was mechanically stirred or agitated during the heating process to assure uniform heating. The inert atmosphere, preferably argon gas can surround the reactant powder mixture or be forced to permeate through the reactant powder mixture during the heating process thereby protecting the reactants from exposure to air. Alternatively, for large scale production the reactant mixture may be heated within a fluidized bed reactor employing recycled inert gas such as argon gas as the fluidizing medium, thus producing the $Fe_{(1-x)}M_xS_{(2-2x)}$ product within the fluidized bed reactor.

The cell of the invention employing a lithium or lithium alloy anode and a cathode comprising the metal doped iron sulfide product as cathode active material is intended for use in indoor or outdoor service. Thus, the cell of the invention is intended for use under normal indoor or outdoor ambient conditions, which may span a temperature range typically from 10° F. to 110° F., but may also span a broader range, for example, between about −20° F. to 120° F. The cell's internal temperature will also be within such temperature range between about −20° F. and 120° F.

The cell may be in the form of a button (coin) cell or flat cell. Desirably the cell may be in the form of a spirally wound cell comprising an anode sheet and a cathode composite sheet spirally wound with separator therebetween. The cathode sheet is produced using a slurry process to coat a cathode mixture comprising metal doped iron sulfide particles onto a conductive surface which can be a conductive metal substrate. The metal doped iron sulfide particles are bound to the conductive substrate using desirably an elastomeric, preferably, a styrene-ethylene/butylene-styrene (SEBS) block copolymer such as KRATON G1651 elastomer (Kraton Polymers, Houston, Tex.). This polymer is a film-former, and possesses good affinity and cohesive properties for the metal doped particles as well as for conductive carbon particle additives in the cathode mixture.

In an aspect of the invention the cathode is formed of a cathode slurry comprising metal doped iron sulfide powder $Fe_{(1-x)}M_xS_{(2-2x)}$, conductive carbon particles, binder material, and solvent. (The term "slurry" as used herein will have its ordinary dictionary meaning and thus be understood to mean a dispersion or suspension of solid particles in liquid.) The wet cathode slurry is coated onto a conductive substrate such as a sheet of aluminum or stainless steel. The conductive substrate functions as a cathode current collector. The solvent is then evaporated leaving dry cathode coating mixture comprising the metal doped iron sulfide material and carbon particles preferably including carbon black adhesively bound to each other and with the dry coating bound to the conductive substrate. The preferred carbon black is acetylene black. The carbon may optionally include graphite particles blended therein.

After the wet cathode slurry is coated onto the conductive substrate, the coated substrate is placed in an oven and heated at elevated temperatures until the solvent evaporates. The resulting product is a dry cathode coating comprising iron disulfide and carbon particles bound to the conductive substrate. On a dry basis, the cathode preferably contains between 83 and 94 percent, desirably between about 83 and 93 percent, preferably between about 85 and 92 percent by weight metal doped iron sulfide ($Fe_{(1-x)}M_xS_{(2-2x)}$) cathode active material. The solids content, that is, the metal doped iron sulfide ($Fe_{(1-x)}M_xS_{(2-2x)}$) particles and conductive carbon particles in the wet cathode slurry is between 55 and 75 percent by weight. The viscosity range for the cathode slurry is typically from about 3500 to 15000 centipoise. (1 centipoise=1 mPas=1 mNewton×sec/m$^2$). After the anode comprising lithium metal and cathode comprising metal doped iron sulfide, with separator therebetween, are inserted into the cell housing, an electrolyte is added to the cell.

The desired electrolyte for the lithium cell of the invention having a cathode comprising the metal doped iron sulfide product as herein described is as follows: The desired electrolyte comprises a lithium salt comprising bistrifluoromethylsulfonyl imide ($Li(CF_3SO_2)_2N$) dissolved in a solvent mixture comprising 1,3-dioxolane and sulfolane as described in commonly assigned international patent application WO 2008/012776 A2. The lithium salt is added in amount between about 0.5 and 1.2 moles per liter, typically about 0.8 moles per liter of the solvent mixture. The solvent mixture desirably comprises between about 70 and 90 volume percent 1,3-dioxolane and between about 10 and 30 volume percent sulfolane. Desirably the electrolyte may contain between about 0.1 and 1 percent by weight pyridine to prevent or retard the rate of dioxolane polymerization. In view of extensive testing as reported herein, it is concluded that the above indicated electrolyte ($Li(CF_3SO_2)_2N$ salt dissolved in the 1,3-dioxolane and sulfolane) is quite compatible with and leads to significant performance improvement in the lithium cell of the invention, wherein the metal doped $Fe_{(1-x)}M_xS_{2-2x}$ product is employed as cathode active material.

1,3-dioxolane (DX) is a cyclic diether, also classified as a heterocyclic acetal. It has a Chemical Abstracts Service Registry No. (CAS) 646-06-0. It has the chemical formula $C_3H_6O_2$ (M.W. 74.08) and the structural formula (I):

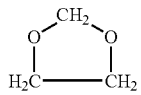

(I)

Sulfolane is a cyclic compound having the molecular formula $C_4H_8O_2S$ and a Chemical Abstracts Service Registry (CAS) No. 126-33-0. Sulfolane is a clear colorless liquid having a boiling point of 285° C., a viscosity of 10.28 centipoise (at 30° C.), and a dielectric constant of 43.26 (at 30° C.). The Structural Formula for Sulfolane is Represented as Follows:

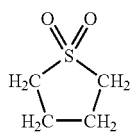

(II)

Applicants herein have determined that in the lithium/metal doped iron sulfide cell it is advantageous to have an electrolyte of low viscosity, between about 0.9 and 1.4 centipoise. The above indicated preferred electrolyte has low viscosity between about 0.9 and 1.4 centipoise, typically between about 1.2 and 1.4 centipoise. Such low viscosity level helps to improve cell performance, because it promotes good lithium ion ($Li^+$) transport between anode and cathode.

In order for the lithium/metal doped iron sulfide cell to discharge properly lithium ions from the anode must have enough ionic mobility enabling good transport across the separator and into the $FeS_2$ cathode. At the cathode the lithium ions participate in the reduction reaction of sulfur ions producing $LiS_2$ at the cathode. Electrolytes of low viscosity are highly desirable for the lithium/metal doped iron sulfide cell because 1) that it reduces lithium ion ($Li^+$) concentration polarization within the electrolyte and 2) it promotes good lithium ion ($Li^+$) transport mobility during discharge. In particular the low viscosity electrolyte for the lithium/metal doped iron sulfide cell reduces lithium ion concentration polarization and promotes better lithium ion transport from anode to cathode when the cell is discharged at high pulsed rate, for example, when the cell is used to power a digital camera. Lithium ion concentration polarization is reflected by the concentration gradient present between the Li anode and the $FeS_2$ cathode as the lithium ion transports from anode to cathode. A low viscosity electrolyte for the lithium/iron sulfide cell reduces the lithium ion concentration buildup at the anode improving the lithium ion ($Li^+$) mobility and in turn improving cell performance.

The metal doped iron sulfide cathode active material $Fe_{(1-x)}M_xS_{(2-2x)}$ of the invention may be beneficially employed in the cathode of a coin (button) cell or wound cell for primary lithium cells, that is, nonrechargeable cells having anodes of lithium or lithium alloy metal.

DETAILED DESCRIPTION

Figure 1A:
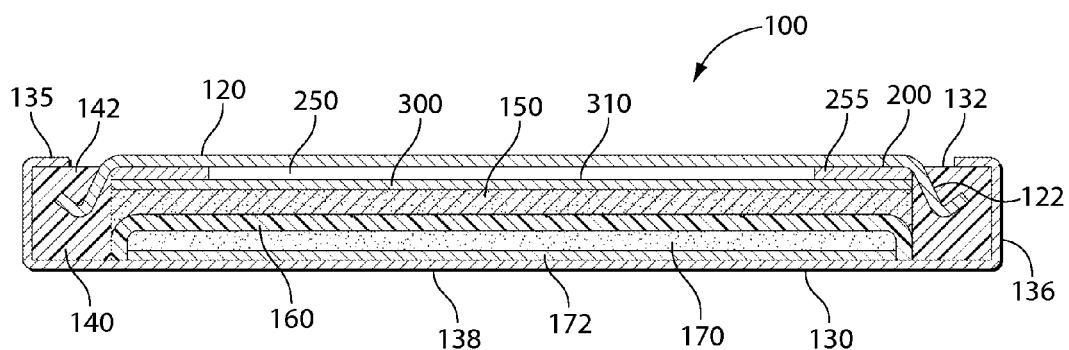
FIG. 1A is a cross sectional view of a lithium/metal doped iron sulfide cell of the invention as presented in a button cell embodiment.

The lithium/metal doped iron sulfide cell of the invention may be in the form of a flat button (coin) cell or a spirally wound cell. A desirable button cell 100 configuration comprising a lithium anode 150 and a cathode 170 comprising iron disulfide ($FeS_2$) with separator 160 therebetween is shown in the FIG. 1A.

Lithium cells having $FeS_2$ cathodes have the following basic discharge reactions (one step mechanism):

Anode:

$$4Li = 4Li^+ + 4e \qquad \text{Eq. 2}$$

Cathode:

$$FeS_2 + 4Li^+ + 4e = Fe + 2Li_2S \qquad \text{Eq. 3}$$

Overall:

$$FeS_2 + 4Li = Fe + 2Li_2S \qquad \text{Eq. 4}$$

In the present invention a button (coin) cell 100 is shown (FIG. 1A) wherein the anode is of lithium or lithium alloy and the cathode comprises a lithium/metal doped iron sulfide product of the invention. That is, the $FeS_2$ has been replaced with the metal doped iron sulfide product of the invention, which functions the cathode active material. The metal doped iron sulfide product has the formula $Fe_{(1-x)}M_xS_{(2-2x)}$ (0.1>x>0.01 and metal M may be nickel, copper, manganese or iron). Cell 100 is a primary (nonrechargeable) cell. In the button cell 100 (FIG. 1A) a disk-shaped cylindrical cathode housing 130 is formed having an open end 132 and a closed end 138. Cathode housing 130 is preferably formed from nickel-plated steel. An electrical insulating member 140, preferably a plastic cylindrical member of disk shape having a hollow core, can be inserted into housing 130 so that the outside surface of insulating member 140 abuts and lines the inside surface of cathode housing 130 side walls 136. Alternatively, the inside surface of side walls 136 may be coated with a polymeric material that solidifies into insulator 140 abutting the inside surface of housing 130. Insulator 140 may first be fitted over the side walls 122 of the anode housing 120 before insertion into cathode housing 130. Insulator 140 can be formed from a variety of thermally stable insulating materials, but is preferably formed of polypropylene.

The cathode 170 comprising the metal doped iron sulfide powder $Fe_{(1-x)}M_xS_{(2-2x)}$ dispersed therein, can be prepared in the form of a slurry which may be coated directly onto a conductive substrate sheet 172 which is desirably a sheet of aluminum, aluminum alloy, or stainless steel. Desirably the cathode 170 in the form of a slurry can be first coated on one side of the conductive substrate, then dried to form the final cathode 170. The finished cathode 170 can be stored in sheets until ready for insertion into the cell housing. The conductive sheet 172 onto which the cathode slurry 170 is coated may be a conductive sheet, such as a sheet of aluminum or aluminum alloy foil without any apertures therethrough. Alternatively, the conductive substrate 172 may be a sheet of stainless steel, aluminum or aluminum alloy, having a plurality of small apertures therein, thus forming a grid or screen. The cathode coating is dried to from a dry cathode 170 coated on one side of the substrate 172. The dried cathode 170 coated on substrate 172 can be subjected to calendering and stored in sheets until ready for insertion into the cell housing.

Figure 6:
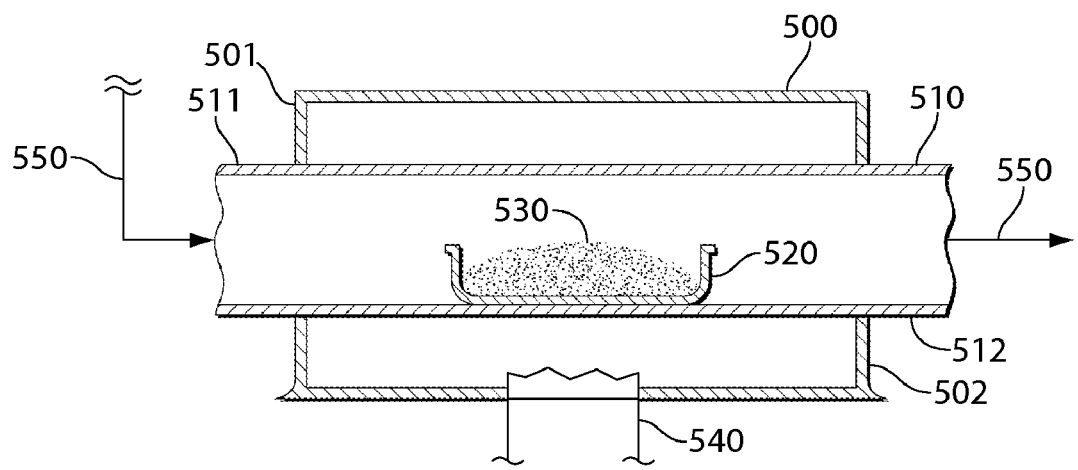
FIG. 6 is a cross-sectional of an oven and internal heating tube for making a product sample of the metal doped iron sulfide.

A desirable metal doped iron sulfide powder $Fe_{(1-x)}M_xS_{2-2x}$ is prepared as herein described by reacting $FeS_2$ powder (available under the trade designation PYROX Red 325 powder from Chemetall GmbH) with metal, M, preferably nickel or copper powder, under a controlled reaction temperature between about 425 and 500° C. in an inert, preferably argon, atmosphere. As above indicated the reactant $FeS_2$ powder and metal (M) powder are preferably reacted as a reaction mixture having mole ratio of $FeS_2$ to M in ratio (1-x):x in accordance with Eq. 1, wherein $0.1 > x > 0.01$ (x may also equal 0.1 or 0.01). That is, the mole fraction of metal (M) in the iron disulfide ($FeS_2$) and metal (M) mixture is between 0.01 and 0.1, or equal to 0.01 or 0.1. The reaction mixture of $FeS_2$ powder and metal powder, preferably of nickel or copper, can be conveniently prepared by mixing the reactants in a mortar with pestle until a homogeneous mixture is obtained. The reaction may be conveniently carried out by first placing a sample reaction mixture 530 of $FeS_2$ and metal powder M in an alumina oxide ceramic container boat 520 and inserting the container boat 520 into an alumina oxide ceramic heating tube 510 as shown in FIG. 6. The ceramic heating tube 510 in turn passes through an electric oven 500 with the ends 511 and 512 of tube 510 penetrating through the oven's opposing end side walls 501 and 502, respectively. Argon gas 550 which may be supplied from a high pressure tank (not shown) may be passed at low flow rate through heating tube 510 in order to assure that the reaction mixture is not exposed to atmospheric air. The oven 500 may be heated by electrical heating coils 540. Once the argon gas flow has been turned on, the oven temperature may be ramped up to the desired reaction temperature and the oven maintained at that temperature for a required period of time. The oven temperature can be regulated by thermostat (not shown) so that the desired reaction temperature, for example, between about 425 to 500° C., can be maintained for the required period, typically between about 3 and 6 hours. By such method samples of reaction mixture 530 comprising $FeS_2$ and metal M powder can be converted to the metal doped iron sulfide product ($Fe_{(1-x)}M_xS_{2-2x}$). The oven is then allowed to cool to ambient temperature and the metal doped iron sulfide product may then be removed from the oven. The metal doped iron sulfide product may be protected from buildup of acidic contaminants on its surface by storing the product in a closed container.

Since the amount of metal reactant M is small in relation to the $FeS_2$ reactant, average particle size of the metal doped iron sulfide product is about the same as the average particle size of the starting $FeS_2$ reactant powder. Thus, the metal doped iron sulfide product may have a mean average particle size between about 1 and 100 micron, desirably between about 10 and 50 micron.

The metal doped iron sulfide powder may then be blended with graphite, carbon black and KRATON G1651 elastomeric binder and solvents to form a cathode slurry. The cathode slurry comprises 2 to 4 wt % of binder (KRATON G1651 elastomeric binder from Kraton Polymers, Houston Tex.); 50 to 70 wt % of active metal doped iron sulfide powder ($Fe_{(1-x)}M_xS_{(2-2x)}$) ($0.1 > x > 0.01$ and metal M may be nickel, copper, manganese or iron); 4 to 7 wt % of conductive carbon (carbon black and graphite); and 25 to 40 wt % of solvent(s). (Carbon black may be made from the incomplete combustion or thermal decomposition of natural gas or petroleum oil. Carbon black may also be acetylene black which is made from the incomplete combustion or thermal decomposition of acetylene. Thus, the carbon black referenced herein, unless otherwise stated, may include in whole or in part acetylene black.) The KRATON G1651 binder is an elastomeric block copolymer (styrene-ethylene/butylene (SEBS) block copolymer) which is a film-former. This binder possesses sufficient affinity for the active metal doped iron sulfide material and carbon black particles to facilitate preparation of the wet cathode slurry and to keep these particles in contact with each other after the solvents are evaporated. The metal doped iron sulfide powder may have a mean average particle size between about 1 and 100 micron, desirably between about 10 and 50 micron.

A suitable graphite is available under the trade designation TIMREX KS6 graphite from Timcal Ltd. TIMREX graphite is a highly crystalline synthetic graphite. (Other graphites may be employed selected from natural, synthetic, or expanded graphite and mixtures thereof, but the TIMREX graphite is preferred because of its high purity.) The carbon black is available under the trade designation Super P conductive carbon black (acetylene black, BET surface of 62 $m^2/g$) from Timcal Co.

The solvents use to form the wet cathode slurry preferably include a mixture of $C_9$-$C_{11}$ (predominately $C_9$) aromatic hydrocarbons available as SHELL SOL A100 hydrocarbon solvent (Shell Chemical Co.) and a mixture of primarily isoparaffins (average M.W. 166, aromatic content less than 0.25 wt. %) available as SHELL SOL OMS hydrocarbon solvent (Shell Chemical Co.). The weight ratio of SHELL SOL A100 to SHELL SOL OMS solvent is desirably at a 4:6 weight ratio. The SHELL SOL A100 solvent is a hydrocarbon mixture containing mostly aromatic hydrocarbons (over 90 wt % aromatic hydrocarbon), primarily $C_9$ to $C_{11}$ aromatic hydrocarbons. The SHELL SOL OMS solvent is a mixture of isoparaffin hydrocarbons (98 wt. % isoparaffins, M.W. about 166) with less than 0.25 wt % aromatic hydrocarbon content. The slurry formulation may be dispersed using a double planetary mixer. Dry powders are first blended to ensure uniformity before being added to the binder solution in the mixing bowl.

A Preferred Cathode Slurry Mixture is Presented in Table 1:

TABLE I

| Cathode Slurry | | |
|---|---|---|
| | Wet Slurry (wt. %) | Dry Cathode (wt. %) |
| Binder (KRATON G1651) | 2.0 | 3.01 |
| Hydrocarbon Solvent (SHELL SOL A100) | 13.4 | 0.0 |
| (SHELL SOL OMS) | 20.2 | 0.0 |

TABLE I-continued

Cathode Slurry

|  | Wet Slurry (wt. %) | Dry Cathode (wt. %) |
| --- | --- | --- |
| Metal doped iron sulfide powder $Fe_{(1-x)}M_xS_{2-2x}$ (preferably M is Ni or Cu and $0.1 > x > 0.01$) | 58.9 | 88.71 |
| Graphite (TIMREX KS6) | 4.8 | 7.23 |
| Carbon Black (Super P) | 0.7 | 1.05 |
| Total | 100.0 | 100.0 |

A similar wet cathode slurry mixture (electrolyte not yet added to the cell) but using $FeS_2$ powder is disclosed in commonly assigned application Ser. No. 11/516,534 (US2008-0057403 A1). The total solids content of the wet cathode slurry mixture 170 is shown in above Table 1 is 66.4 wt. %

The wet cathode slurry 170 is coated onto a side of the above mentioned conductive substrate 172 desirably a sheet of stainless steel, aluminum or aluminum alloy. The conductive sheet may have perforations or apertures therein or may be a solid sheet without such perforations or apertures. The wet cathode slurry 170 may be coated onto the conductive substrate using intermittent roll coating technique. The cathode slurry coated on the conductive substrate is dried gradually adjusting or ramping up the temperature from an initial temperature of 40° C. to a final temperature of about 130° C. in an oven until the solvent has all evaporated. (Drying the cathode slurry in this manner avoids cracking.) This forms a dry cathode coating 170 comprising the metal doped iron sulfide, carbon particles, and binder on the conductive substrate. Optionally, the opposite side of the conductive substrate may be coated with the same or similar wet cathode slurry 170. This second wet cathode coating 170 may likewise be dried in the same manner as the first coating. The coated cathode is then passed between calendering rolls to obtain the desired dry cathode thicknesses. If both sides of the conductive substrate is coated with cathode material, then the dried cathode 170 may typically have a final thickness of between about 0.170 and 0.186 mm, which includes the 20 micron thick conductive substrate, preferably aluminum foil. For purposes of producing a coin cell 100 (FIG. 1A) for use in experiments reported herein, only one side of an aluminum foil was coated with cathode slurry and dried to form dry cathode 170. The dried cathode coating on the aluminum sheet was calendered to form a dry cathode 170 having a total final thickness of about 0.096 mm, which includes the 20 micron thick aluminum foil. (The opposite side of the aluminum foil was not coated with cathode material.)

The dry cathode coating 170 thus has the following desirable formulation: Metal doped iron sulfide powder, $(Fe_{(1-x)}M_xS_{(2-2x)})$ ($0.1>x>0.01$), 89 wt. %; Binder (KRATON G1651), 3 wt. %; Graphite (TIMREX KS6), 7 wt. %, and Carbon Black (Super P), 1 wt %. The carbon black (Super P carbon black) develops a carbon network which improves conductivity.

A durable dry cathode 170 sheet is thus formed in this manner. The cathode 170 sheet may be set aside until ready to be cut to proper size for insertion into the cell housing.

Figure 1B:
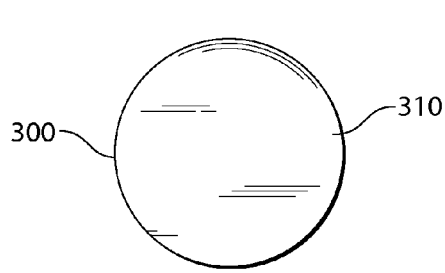
FIG. 1B is a plan view of a spacer disk for insertion into the cell of FIG. 1A.
Figure 1C:
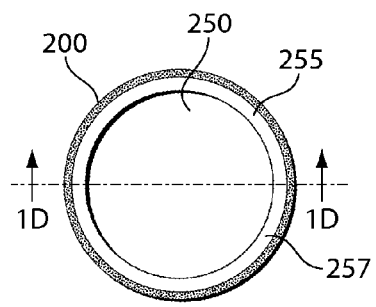
FIG. 1C is plan view of a spring ring for insertion into the cell of FIG. 1A.
Figure 1D:
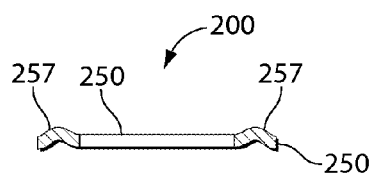
FIG. 1D is a cross sectional view of the spring ring of FIG. 1C.

There can be variations in the sequence of assembling and loading the cell contents into the cell housing. However it has been determined that button cell 100 can be conveniently assembled in the following manner to form a completed cell suitable for use or testing:

The button (coin) cell 100 can be formed conveniently by loading the anode housing 120, preferably of nickel plated steel, with all of the necessary cell components, including the electrolyte. Then the cathode housing 130, preferably of aluminum plated steel, can be inserted and crimped over the anode housing 120 to tightly close the cell. Thus, a durable cell 100, can be assembled by first inserting insulator disk 142, preferably of polypropylene, over the anode housing 120 so that it covers the side walls 122 of said housing 120 (FIG. 1A). Then spring ring 200 (FIG. 1C) can be inserted into the anode housing 120 so that it lies against the inside surface of the closed end of said housing as shown in FIG. 1A. Spring ring 200, preferably of stainless steel, has a central aperture 250 therethrough bounded by circumferential ring surface 255. Ring surface 255 is not flat but rather has integral convolutions 257 therein as shown in FIG. 1D. The convolutions 257 gives ring 200 a spring action when it is inserted in the anode housing 120 as pressure is applied to the ring. Next one or more spacer disks 300, preferably of stainless steel, can be inserted into anode housing 120 so that it presses onto spring ring 200 as shown in FIG. 1A. The spacer disks 300 can be solid flat disks as shown in FIG. 1B. A plurality of such spacer disks 300 can be employed to assure a tight fit of the cell contents within the completed cell. A lithium anode sheet 150, of lithium or lithium alloy metal, can then be inserted into the anode housing so that it lies against spacer disk 300 as shown in FIG. 1A. The anode housing can be inverted so that its open end is on top. Separator sheet 160, preferably of microporous polypropylene, can then be inserted against the lithium anode sheet 150.

The electrolyte solution preferably comprising a mixture of bistrifluoromethylsulfonyl imide $(Li(CF_3SO_2)_2N)$ dissolved in a solvent mixture comprising 1,3-dioxolane and sulfolane with small amount pyridine added can then be poured over the exposed surface of the separator sheet 160 so that it becomes absorbed into the separator. Cathode sheet 170 above described comprising the metal doped iron sulfide powder of the invention, can be cut to proper size and then inserted against the exposed side of the separator sheet 160. In this manner all of the cell components are inserted into the anode housing 120. The cathode housing 130 can then be inserted over the anode housing 120 so that the side wall 136 of the cathode housing 130 covers side wall 122 of anode housing 120 with insulator 140 therebetween. The edge 135 of the cathode housing 130 is crimped over the exposed insulator edge 142. The edge 135 bites into the insulator edge 142 to close the cell and tightly seal the cell contents therein. This results in a durable button cell 100 which resists electrolyte leakage.

A preferred electrolyte employed in the above described cell 100 comprises a lithium salt comprising bistrifluoromethylsulfonyl imide $(Li(CF_3SO_2)_2N)$ dissolved in a solvent mixture comprising 1,3-dioxolane and sulfolane. The lithium salt is added in amount between about 0.5 and 1.2 moles per liter, typically about 0.8 moles per liter of the solvent mixture. The solvent mixture desirably comprises between about 70 and 90 volume percent (typically 80 volume percent) 1,3-dioxolane and between about 10 and 30 (typically 20 volume percent) sulfolane. Desirably the electrolyte may contain between about 0.1 and 1 percent by weight pyridine to prevent or retard the rate of dioxolane polymerization.

Figure 1:
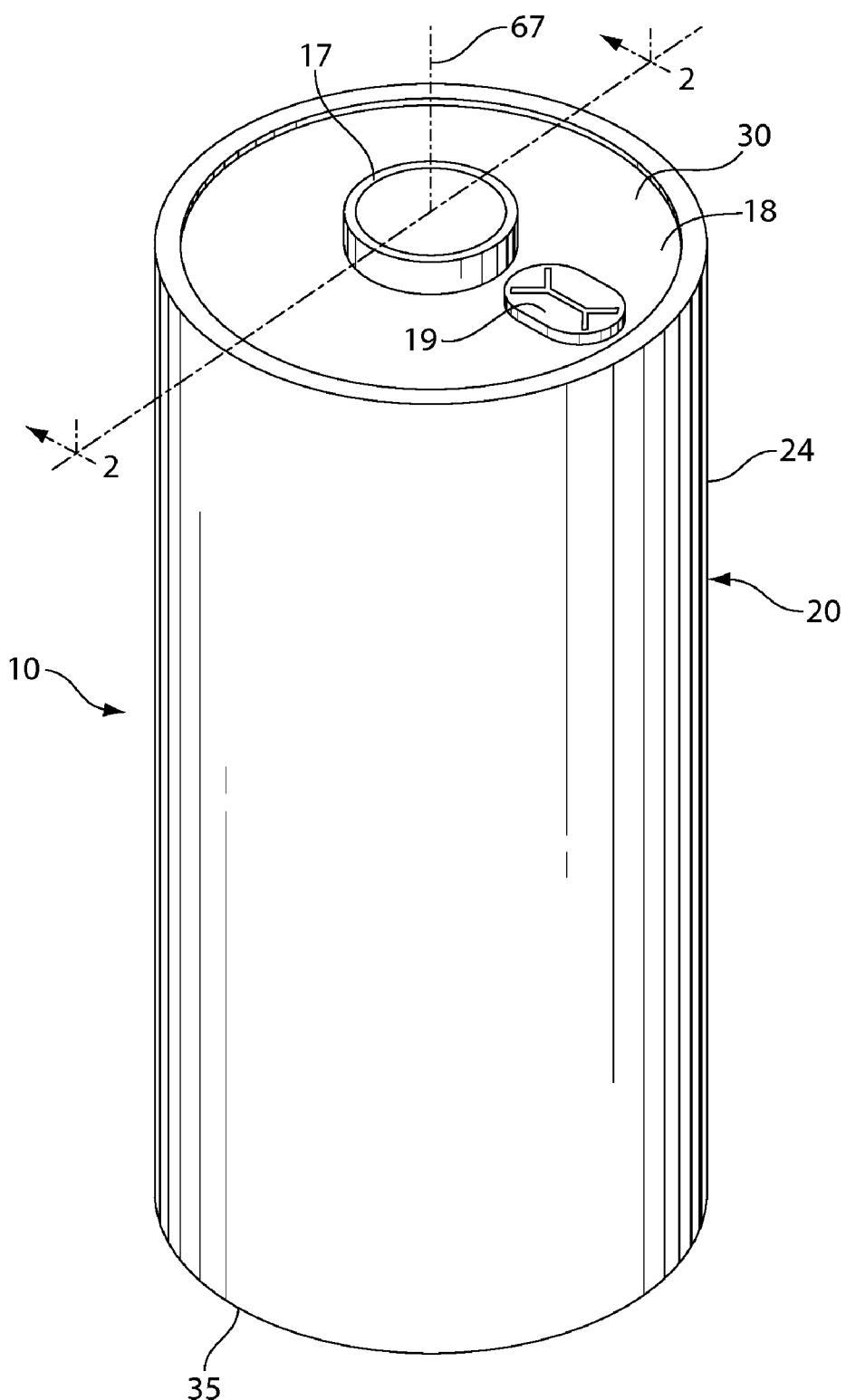
FIG. 1 is a pictorial view of a lithium/metal doped iron sulfide cell of the invention as presented in a cylindrical cell embodiment.

In another embodiment the lithium/metal doped iron sulfide cell may be in the configuration of a cylindrical cell 10 as shown in FIG. 1. The cylindrical cell 10 may have a spirally wound anode sheet 40, cathode 60 with separator sheet 50 therebetween as shown in FIGS. 2-5. The cell 10 internal configuration, apart from the difference in cathode composition, may be similar to the spirally wound configuration shown and described in U.S. Pat. No. 6,443,999. The anode sheet 40 as shown in the figures comprises lithium metal and the cathode sheet 60 comprises the metal doped iron sulfide product ($Fe_{(1-x)}M_xS_{(2-2x)}$) ($0.1>x>0.01$ and metal M may be nickel, copper, manganese or iron). The cell is preferably cylindrical as shown in the figures and may be of any size, for example, AAAA (42×8 mm), AAA (44×9 mm), AA (49×12 mm), C (49×25 mm) and D (58×32 mm) size. Thus, cell 10 depicted in FIG. 1 may also be a ⅔ A cell (35×15 mm).

Figure 3:
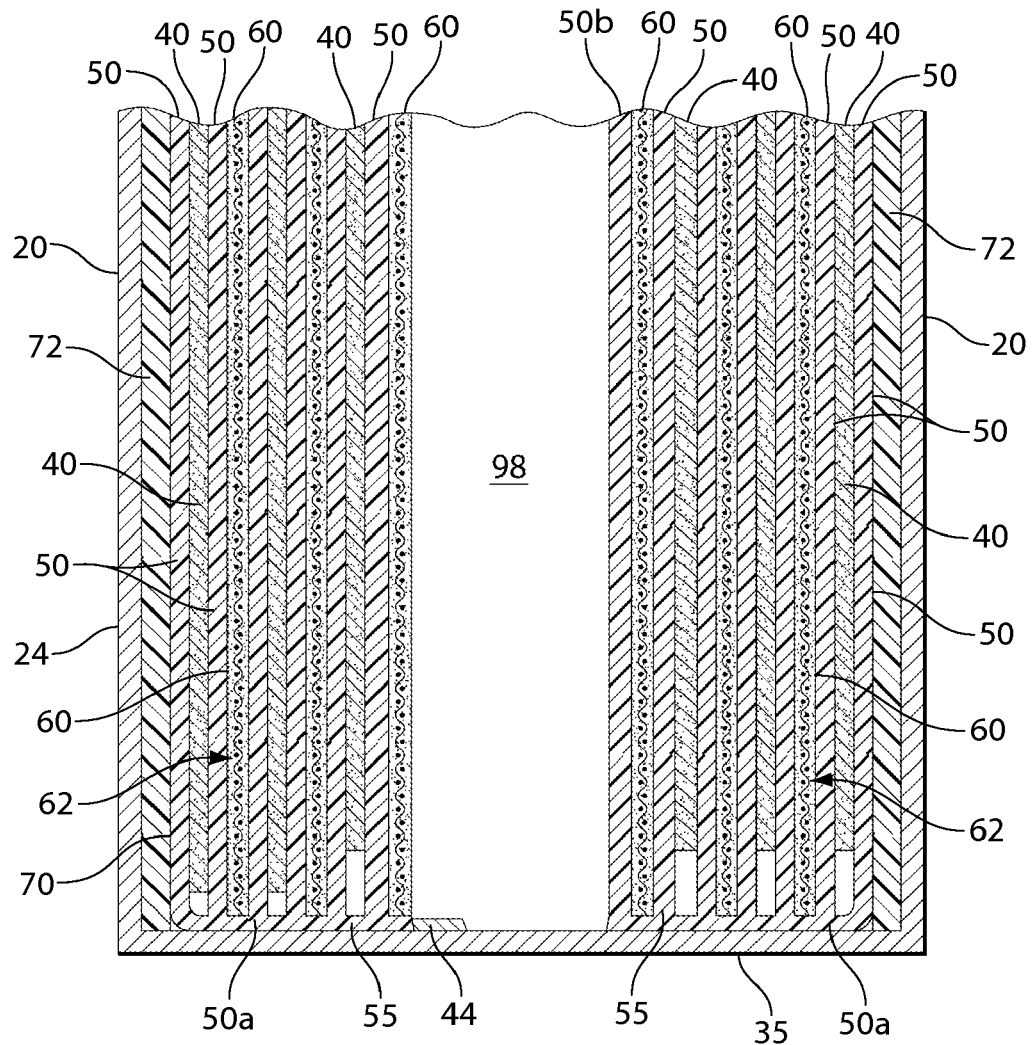
FIG. 3 is a partial cross sectional elevation view of the cell taken through sight lines 2-2 of FIG. 1 to show a spirally wound electrode assembly.
Figure 4:
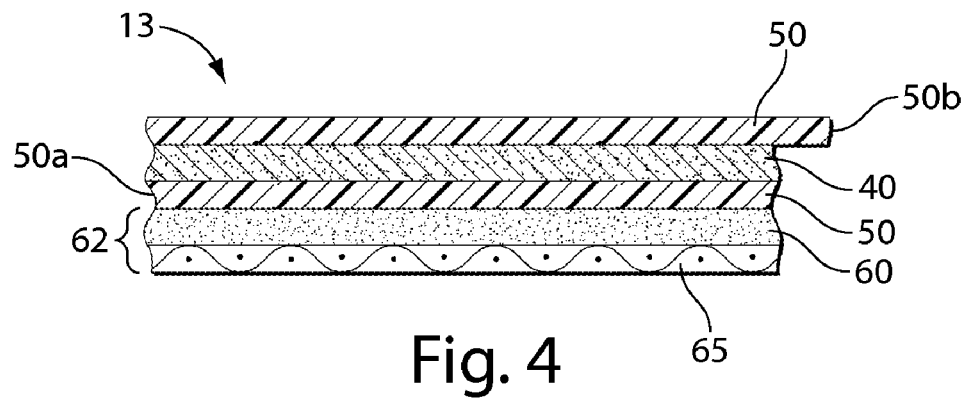
FIG. 4 is a schematic showing the placement of the layers comprising the electrode assembly.
Figure 5:
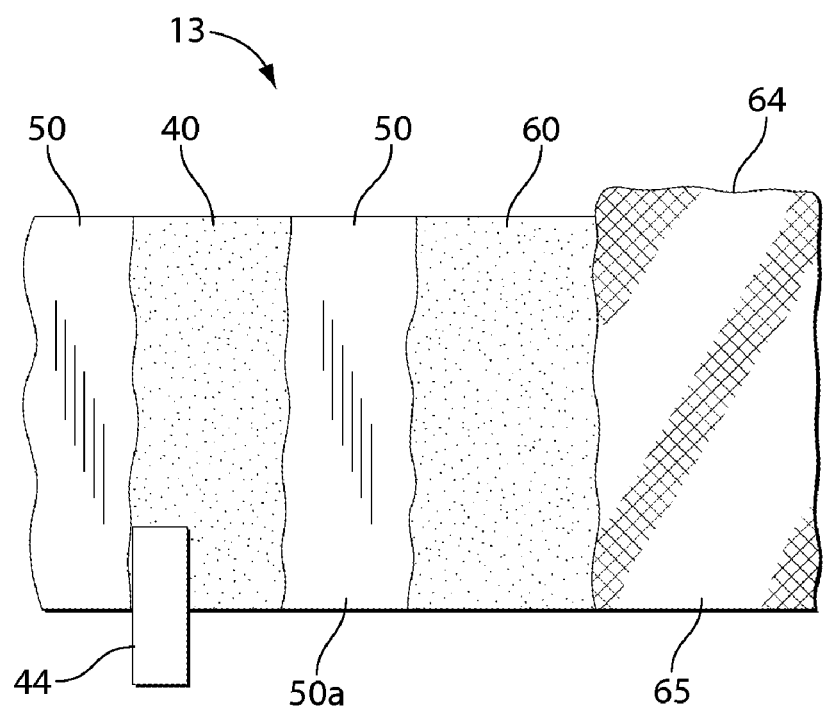
FIG. 5 is a plan view of the electrode assembly of FIG. 4 with each of the layers thereof partially peeled away to show the underlying layer.

For a spirally wound cell, a preferred shape of the cell casing (housing) 20 is cylindrical as shown in FIG. 1. A similar wound cell structural configuration for a lithium cell but employing $FeS_2$ as cathode active material is also shown and described in commonly assigned patent application Ser. No. 11/516,534 (US2008-0057403 A1). Casing 20 is preferably formed of nickel plated steel. The cell casing 20 (FIG. 1) has a continuous cylindrical surface. The spiral wound electrode assembly 70 (FIG. 3) comprising anode 40 and cathode composite 62 with separator 50 therebetween can be prepared by spirally winding a flat electrode composite 13 (FIGS. 4 and 5). Cathode composite 62 comprises a layer of cathode 60 comprising iron disulfide ($FeS_2$) coated onto metallic substrate 65 (FIG. 4).

The electrode composite 13 (FIGS. 4 and 5) can be made in the following manner: The cathode 60 comprising the metal doped iron sulfide powder ($Fe_{(1-x)}M_xS_{(2-2x)}$) ($0.1>x>0.01$), with M selected from nickel, copper, iron, and manganese) dispersed therein can be initially prepared in the form of a wet slurry which is coated onto a conductive substrate sheet or metal foil 65. The conductive substrate 65 may be a sheet of aluminum or stainless steel, for example, expanded metal foil of aluminum or stainless steel (FIG. 4). If an aluminum sheet 65 is used it may be a solid sheet of aluminum without openings therethrough or may be a sheet of expanded aluminum foil (EXMET expanded aluminum foil) with openings therethrough thus forming a grid or screen. (EXMET aluminum or stainless steel foil from Dexmet Company, Branford, Conn.). The apertures in conductive substrate sheet 65 may also be the result of punching or piercing holes therein. The expanded metal foil may have a basis weight of about 0.024 g/cm² forming a mesh or screen with openings therein. Typically the aluminum sheet 65 may have a thickness between about 0.015 and 0.040 mm.

The wet cathode slurry mixture having the composition shown above in Table 1 comprising iron disulfide ($FeS_2$), binder, conductive carbon and solvents is prepared by mixing the components shown in Table 1 until a homogeneous mixture is obtained.

The above quantities (Table 1) of components of course can be scaled proportionally so that small or large batches of cathode slurry can be prepared. The wet cathode slurry thus preferably has the following composition: metal doped iron sulfide powder ($Fe_{(1-x)}M_xS_{(2-2x)}$ $0.1>x>0.01$ and M selected from nickel, copper, iron or manganese), 58.9 wt. %; Binder, KRATON G1651 (2 wt. %); Graphite, TIMREX KS6 (4.8 wt %), Actylene Black, Super P (0.7 wt %), Hydrocarbon Solvents, SHELL SOL A100 (13.4 wt %) and ShelSol OMS (20.2 wt %)

The cathode slurry is coated onto at least one side of a conductive substrate or grid 65, preferably a sheet of aluminum, or stainless steel expanded metal foil. The cathode slurry coated on the metal substrate 65 is dried in an oven preferably gradually adjusting or ramping up the temperature from an initial temperature of 40° C. to a final temperature not to exceed 130° C. for about ½ hour or until the solvent has all evaporated. This forms a dry cathode coating 60 comprising the metal doped iron sulfide powder, carbon particles, and binder on the metal substrate 65 and thus forms the cathode composite sheet 62 shown best in FIG. 4. A calendering roller is then applied to the coating to obtain the desired cathode thicknesses. Optionally, the cathode slurry may then also be coated onto the opposite side of the same conductive substrate 65. The cathode slurry coating on the opposite side of substrate 65 is then dried in the same manner as above describe, followed by calendering the dried coating. This results in a cathode composite sheet 62 with dry cathode coating 60 coated on both sides of metal substrate 65.

For an AA size primary cell with lithium anode and cathode comprising metal doped iron sulfide (lithium/metal doped iron sulfide cell), the desired thickness of the dry cathode composite 62 is between about 0.172 and 0.188 mm, preferably between about 0.176 and 0.180 mm, with a cathode coating 60 coated on both sides of aluminum substrate 65. This includes the substrate 65, preferably of aluminum foil, having a thickness of between about 0.015 and 0.040 mm. The dry cathode coating 60 thus has the following desirable formulation: metal doped iron sulfide powder, $Fe_{(1-x)}M_x S_{(2-2x)}$ $0.1>x>0.01$ (89.0 wt. %); binder, KRATON G1651 elastomer (3.0 wt. %); conductive carbon particles, preferably graphite (7 wt. %) available as TIMREX KS6 graphite from Timcal Ltd and conductive carbon black (1 wt %) available as Super P conductive carbon black from Timcal. The carbon black develops a carbon network which improves conductivity. Optionally between about 0 and 90 percent by weight of the total carbon particles may be graphite. The graphite if added may be natural, synthetic or expanded graphite and mixtures thereof. The dry cathode coating may typically comprise between about 85 and 95 wt. % metal doped iron sulfide powder; between about 4 and 8 wt. % conductive carbon; and the remainder of said dry coating comprising binder material.

The anode 40 can be prepared from a solid sheet of lithium metal. The anode 40 is desirably formed of a continuous sheet of lithium metal (99.8% pure). Alternatively, the anode 40 can be an alloy of lithium and an alloy metal, for example, an alloy of lithium and aluminum. In such case the alloy metal, is present in very small quantity, preferably less than 1 or 2 percent by weight of the lithium alloy. Upon cell discharge the lithium in the alloy thus functions electrochemically essentially as pure lithium. Thus, the term "lithium or lithium metal" as used herein and in the claims is intended to include in its meaning such lithium alloy. The lithium sheet forming anode 40 does not require a substrate. The lithium anode 40 can be advantageously formed from an extruded sheet of lithium metal having a thickness of desirably between about 0.10 and 0.20 mm desirably between about 0.12 and 0.19 mm, preferably about 0.15 mm for the spirally wound cell.

Individual sheets of electrolyte permeable separator material 50, preferably of microporous polypropylene having a thickness of about 0.025 mm or less, preferably between about 0.008 and 0.025 mm, is inserted on each side of the lithium anode sheet 40 (FIGS. 4 and 5). The microporous polypropylene desirably has a pore size between about 0.001 and 5 micron. The first (top) separator sheet 50 (FIG. 4) can be designated the outer separator sheet and the second sheet 50 (FIG. 4) can be designated the inner separator sheet. The cathode composite sheet 62 comprising cathode coating 60 on conductive substrate 65 is then placed against the inner separator sheet 50 to form the flat electrode composite 13 shown in FIG. 4. The flat composite 13 (FIG. 4) is spirally wound to form electrode spiral assembly 70 (FIG. 3). The winding can be accomplished using a mandrel to grip an extended separator edge 50*b* (FIG. 4) of electrode composite 13 and then spirally winding composite 13 clockwise to form wound electrode assembly 70 (FIG. 3).

Figure 2:
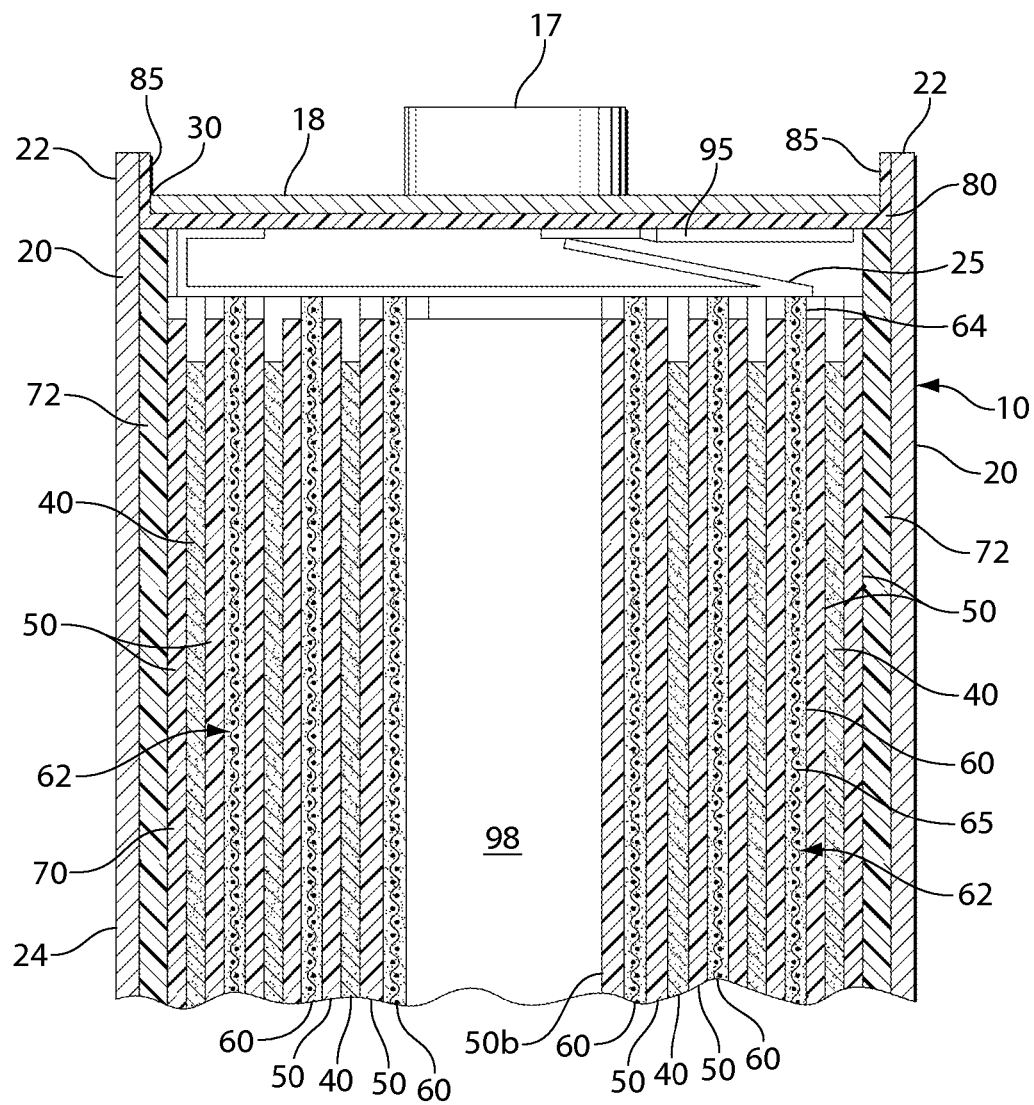
FIG. 2 is a partial cross sectional elevation view of the cell taken through sight lines 2-2 of FIG. 1 to show the top and interior portion of the cell.

When the winding is completed separator portion 50*b* appears within the core 98 of the wound electrode assembly 70 as shown in FIGS. 2 and 3. By way of non limiting example, the bottom edges 50*a* of each revolution of the separator may be heat formed into a continuous membrane 55 as shown in FIG. 3 and taught in U.S. Pat. No. 6,443,999. As may be seen from FIG. 3 the electrode spiral 70 has separator material 50 between anode sheet 40 and cathode composite 62. The spirally wound electrode assembly 70 has a configuration (FIG. 3) conforming to the shape of the casing body. The spirally wound electrode assembly 70 is inserted into the open end 30 of casing 20. As wound, the outer layer of the electrode spiral 70 comprises separator material 50 shown in FIGS. 2 and 3. An additional insulating layer 72, for example, a plastic film such as polypropylene tape, can desirably be placed over a of the outer separator layer 50, before the electrode composite 13 is wound. In such case the spirally wound electrode 70 will have insulating layer 72 in contact with the inside surface of casing 20 (FIGS. 2 and 3) when the wound electrode composite is inserted into the casing. Alternatively, the inside surface of the casing 20 can be coated with electrically insulating material 72 before the wound electrode spiral 70 is inserted into the casing.

The electrolyte mixture can then be added to the wound electrode spiral 70 after it is inserted into the cell casing 20. A desirable electrolyte for use with the lithium/metal doped iron sulfide cell 100 as above described comprises lithium salt comprising bistrifluoromethylsulfonyl imide ($Li(CF_3SO_2)_2N$) dissolved in a solvent mixture comprising 1,3-dioxolane and sulfolane. The lithium salt is added in amount between about 0.5 and 1.2 moles per liter, typically about 0.8 moles per liter of the solvent mixture. The solvent mixture desirably comprises between about 70 and 90 volume percent (typically 80 volume percent) 1,3-dioxolane and between about 10 and 30 (typically 20 volume percent) sulfolane. Desirably the electrolyte may contain between about 0.1 and 1 percent by weight pyridine to prevent or retard the rate of dioxolane polymerization.

An end cap 18 forming the cell's positive terminal 17 may have a metal tab 25 (cathode tab) which can be welded on one of its sides to inside surface of end cap 18. Metal tab 25 is preferably of aluminum or aluminum alloy. A portion of the cathode substrate 65 forms an extended portion 64 extending from the top of the wound spiral as shown in FIG. 2. The extended portion 64 can be welded to the exposed side of metal tab 25 before the casing peripheral edge 22 is crimped around the end cap 18 with peripheral edge 85 of insulating disk 80 therebetween to close the cell's open end 30. End cap 18 desirably has a vent 19 which can contain a rupturable membrane designed to rupture and allow gas to escape if the gas pressure within the cell exceeds a predetermined level. Positive terminal 17 is desirably an integral portion of end cap 18. Alternatively, terminal 17 can be formed as the top of an end cap assembly of the type described in U.S. Pat. No. 5,879,832, which assembly can be inserted into an opening in the surface of end cap 18 and then welded thereto.

A metal tab 44 (anode tab), preferably of nickel can be pressed into a portion of the lithium metal anode 40. Anode tab 44 can be pressed into the lithium metal at any point within the spiral, for example, it can be pressed into the lithium metal at the outermost layer of the spiral as shown in FIG. 5. Anode tab 44 can be embossed on one side forming a plurality of raised portions on the side of the tab to be pressed into the lithium. The opposite side of tab 44 can be welded to the inside surface of the casing either to the inside surface of the casing side wall 24 or more preferably to the inside surface of close end 35 of casing 20 as shown in FIG. 3. It is preferable to weld anode tab 44 to the inside surface of the casing closed end 35, since this is readily accomplished by inserting an electrical spot welding probe (an elongated resistance welding electrode) into the cell core 98. Care should be taken to avoid contacting the welding probe to the separator starter tab 50*b* which is present along a portion of the outer boundary of cell core 98.

The primary lithium cell 10 may optionally also be provided with a PTC (positive thermal coefficient) device 95 located under the end cap 18 and connected in series between the cathode 60 and end cap 18 (FIG. 2). Such device protects the cell from discharge at a current drain higher than a predetermined level. Thus, if the cell is drained at an abnormally high current, e.g., higher than about 6 to 8 Amp, for a prolonged period, the resistance of the PTC device increases dramatically, thus shutting down the abnormally high drain. It will be appreciated that devices other than vent 19 and PTC device 95 may be employed to protect the cell from abusive use or discharge.

EXAMPLES

Performance of Test Lithium Cells with Metal Doped Iron Sulfide Cathode Compared to Comparative Lithium Cells Test Coin Cell Assembly:

A coin shaped cathode housing 130 of aluminum plated steel and a coin shaped anode housing 120 of nickel plated steel is formed of a similar configuration shown in FIG. 1A. The finished cell 100 had an overall diameter of about 20 mm and a thickness of about 3 mm. (This is the size of a conventional ASTM size 2032 coin cell.) The weight of metal doped iron sulfide in the cathode housing 130 was 0.0232 g. The lithium in the anode housing 120 was in electrochemical excess.

In forming each cell 100 a plastic insulating of ring shape 140 was first fitted around the side wall 122 of anode housing 120 (FIG. 1A). A spring ring 200 of stainless steel was placed against the inside surface of the anode housing 120. Ring 200 is inserted into anode housing 120 without the need to weld the ring to the anode housing 120. Ring 200, shown best in FIG. 1C, has a circumferential edge 255 bounding central aperture 250. Circumferential edge surface 255 has convolutions 257 (FIG. 1D) integrally formed therein so that edge surface 255 does not lie entirely in the same plane. When spring ring 200 is inserted into anode housing 120 and pressure is applied to the edge surface 255, convolutions 257 therein give the ring resilience and a spring effect. A spacer disk 300 having a flat solid surface 310 is then next inserted into the anode housing 120 so that it lies against spring ring 200 (FIG. 1A). More than one spacer disk 300 may be inserted on top of each other in stacked arrangement in order to provide a tight fit of the cell contents within the cell. In the test coin cell 100 three stainless steel spacer disks 300 were applied in stacked arrangement against spring ring 200.

A lithium disk 150 formed of a sheet of lithium metal having a thickness of 0.006 inch (0.15 mm) was punched out in a dry room using a 0.56 inch hand punch. The lithium disk 150 (FIG. 1A) forming the cell's anode was then pressed onto the underside of the spacer disks 300 using a hand press.

A cathode slurry was then prepared and coated over one side of an aluminum sheet 172. The components of the cathode slurry comprising iron disulfide (FeS$_2$) were mixed together in the following proportion:

Metal doped iron sulfide powder Fe$_{(1-x)}$M$_x$S$_{(2-2x)}$, 0.1>x>0.01 (58.9 wt. %); Binder, styrene-ethylene/butylene-styrene elastomer (KRATON G1651) (2 wt. %); Graphite (TIMREX KS6) (4.8 wt %), Carbon Black (Super P carbon black) (0.7 wt %), Hydrocarbon Solvents, SHELL SOL A100 solvent (13.4 wt %) and SHELL SOL OMS solvent (20.2 wt %).

The wet cathode slurry on the aluminum sheet 172 was then dried in an oven between 40° C. and 130° C. until the solvent in the cathode slurry all evaporated, thus forming a dry cathode coating comprising metal doped iron sulfide, conductive carbon and elastomeric binder coated on a side of the aluminum sheet. The aluminum sheet 172 was an aluminum foil of 20 micron thickness. The dried cathode coating 170 on the aluminum sheet 172 was calendered to form a dry cathode 170 having a total final thickness of about 0.096 mm, which includes the 20 micron thick aluminum foil. (The opposite side of the aluminum sheet 172 was not coated with cathode material.)

The anode housing 120 is inverted so that its open end faces up. Separator disk 160 is inserted into the anode housing 120 so that it contacts the lithium anode disk 150. Separator disk 160 was of microporous polypropylene (Celgard CG2500 separator from Celgard, Inc.) The separator disk was previously punched out from sheets into the required disk shape using a hand punch having a diameter of 0.69 inch (17.5 mm).

With the anode housing 120 inverted with the open end on top, 0.2 g of the electrolyte solution was added over separator 160. The electrolyte comprised a lithium salt comprising bistrifluoromethylsulfonyl imide (Li(CF$_3$SO$_2$)$_2$N) at 0.8 mol/liter dissolved in a solvent mixture comprising 1,3-dioxolane (80 vol %) and sulfolane (20 vol %) with 0.1 wt % pyridine added.

The dried cathode 170 was cut to size in disk shape with a hand punch having a diameter of 0.44 inch (11.1 mm) and inserted into the anode housing 120 so that it contacts the electrolyte soaked separator 160. The cathode 170 with dried cathode coating on one side of the aluminum sheet 172 faces separator 160, thus forming the anode/cathode interfacial area. The opposite side of the aluminum sheet 172 (not coated) contacts the closed end 138 of housing 130. The amount of metal doped iron sulfide in the dried cathode 170 for each cell was identical. The amount of metal doped iron sulfide which is subject to electrochemical discharge is about 0.0232 g. The dry cathode coating 170 for each cell had the following composition:

Metal doped iron sulfide powder Fe$_{(1-x)}$M$_x$S$_{(2-2x)}$, 0.1>x>0.01 (89.0 wt. %); Binder KRATON G1651 elastomer (3.0 wt. %); conductive carbon particles, graphite TIMREX KS6 (7 wt. %) and carbon acetylene black, Super P (1 wt %).

The cathode housing 130 was then placed over the filled anode housing 120 so that the side wall 136 of the cathode housing 130 covered side wall 122 of anode housing 120 with insulator 140 therebetween. The closed end 138 of the cathode housing 130 was centered within a mechanical crimper. A mechanical crimper arm was then pulled down all of the way to crimp the peripheral edge 135 of the cathode housing 130 over the edge 142 of insulating disk 140. This process was repeated for each cell, thus forming the completed coin cell 100 shown in FIG. 1A. After each cell had been formed, the outside surfaces of the housings of the cells were wiped cleaned with methanol.

Comparative Coin Cells

The comparative coin cells were prepared in the same manner as the above described test cells using same size cell, same lithium anode, separator and electrolyte, and same cathode composition except that FeS$_2$ or simple (unheated) mixtures of FeS$_2$ and metal M were employed instead of same amount metal doped iron sulfide cathode active material as used in the test cells.

Test Results

Five groups of mixtures of FeS$_2$ and metal (Ni or Cu) powders were prepared in various molar ratios. The mixture was blended in a mortar with pestle. The molar ratio of FeS$_2$ to metal (Ni or Cu) was between about 0.96:0.04 to 0.99:0.01. The specific molar ratio of FeS$_2$ to metal (Ni or Cu) and average particle size of FeS2 and metal powder as employed in each of the five groups are given in Table II. A sample from each of the five groups of mixtures was heated according to the process of the invention to produce a metal doped iron sulfide product. Another sample from each of the respective groups was set aside without heating.

A sample from each of the five groups of mixtures was subjected to the process of the invention wherein the samples contained the molar ratio of FeS$_2$ to metal (Ni or Cu) was between about 0.96:0.04 to 0.99:0.01. Each sample was heated in a reactor tube 510 within oven 500 for about 3 hours at 500° C. in the presence of an argon atmosphere 550 (FIG. 6). This produced a metal doped iron sulfide product according to the following reaction, when the doping metal, M, is either Ni or Cu:

$$(1-x)\text{FeS}_2 + x\text{M} \rightarrow \text{Fe}_{(1-x)}\text{M}_x\text{S}_{(2-2x)} \qquad \text{Eq. 5}$$

wherein M is Ni or Cu, and x is between 0.01 and 0.1

For the groups 1-5 the metal M is either Ni or Cu, and x is between about 0.01 and 0.04 with (1-x) correspondingly between about 0.99 and 0.96. The reactant mixture of FeS$_2$ and metal M was prepared in each case according to Eq. 5 resulting in the metal doped iron sulfide product having the formula Fe$_{(1-x)}$M$_x$S$_{(2-2x)}$. In other words the reactants (1-x) FeS$_2$ and xM (xNi or xCu) for x between 0.01 and 0.1 were reacted in the amounts shown in the above equation, without requiring any excess amount of either FeS$_2$ or M to produce the resulting metal doped Fe$_{(1-x)}$M$_x$S$_{(2-2x)}$ product. The particle size of the Fe$_{(1-x)}$M$_x$S$_{(2-2x)}$ product was about the same as the FeS$_2$ reactant particle size as given in Table II. An analysis of the product using x-ray diffraction analysis technique indicated that the metal M (Ni or Cu) was doped (incorporated) into and became an integral part of the iron sulfide crystalline structure. The x-ray analysis of the product revealed that there was no free nickel in the product sample. The x-ray peak identifying the product, had shifted to a lower angle away from the peak expected for FeS$_2$ indicating a change in the crystalline chemistry which now incorporated the metal (Ni or Cu) therein. Thus, the metal M (Ni or Cu) was no longer present in simple physical mixture with the FeS$_2$ but became incorporated into the crystalline structure resulting in the product Fe$_{(1-x)}$M$_x$S$_{(2-2x)}$. The formed product Fe$_{(1-x)}$M$_x$S$_{(2-2x)}$ was a solid state crystalline structure with the metal M (Ni or copper) fully incorporated and chemically bonded therein.

The reactant product Fe$_{(1-x)}$Ni$_x$S$_{(2-2x)}$ for each of the five groups was produced by subjecting the corresponding reactant mixture to heating by the process of the invention. Thus, a reaction mixture 530 for each of the group mixtures was prepared in the mole ratio FeS$_2$:M indicated in Table II and a 5 g sample of the reaction mixture 530 was placed into a small open alumina oxide ceramic boat 520 which was about 3 inches (7.62 cm) long and about 1.5 inches (3.8 cm) wide (FIG. 6). The ceramic boat 520 containing the reaction mixture 530 in turn was placed into a 3 inch (7.62 cm) diameter straight alumina oxide ceramic heating tube 510 of about 5 ft (152 cm) length. The heating tube 510 was inserted into an electric oven 500 of about 4 ft. square (122 cm square) with the heating tube ends 511 and 512 penetrating out through opposing end walls 501 and 502, respectively, of the oven. The inlet end of the heating tube was connected to a pressurized tank of argon gas 550. The tank valve was opened slightly to feed a supply of argon gas 550 at low flow rate of 1 liter per minute through the heating tube 510. The presence of argon gas in the heating tube assured that the reaction mixture of $FeS_2$ and metal would not be exposed to air during any portion of the heating period. Thus, the main purpose of the argon gas was to protect the reaction mixture from exposure to air and atmospheric during the heating period.

The oven with heating tube 510 and sample 530 in place was initially heated at a rate of 3° C. per minute until it reached the desired reaction temperature (between about 425 and 500° C.). The temperature of the reaction mixture 530 was maintained at that temperature for the reaction period, which varied between 3 to 6 hours. The specific reaction temperature and reaction time employed for each group of Test Cells is summarized in Table II. During this time the $FeS_2$ and small amount of metal M (Ni or Cu) in the alumina boat react according to Eq. 5 to form the metal doped iron sulfide product $Fe_{(1-x)}M_xS_{(2-2x)}$. The product is then left to cool to ambient temperature in the presence of the argon atmosphere. After cooling to ambient temperature, the $Fe_{(1-x)}M_xS_{(2-2x)}$ product is removed from the heating tube and can be used to make the cathode material.

TABLE II

Composition of $FeS_2$ and Metal Mixtures Used
To Prepare the $Fe_{(1-x)}M_xS_{(2-2x)}$ Metal Doped Product

| Group No. | Molar Ratio of $FeS_2$:M | Metal (M) | Average Particle Size of $FeS_2$ (μm) | Average Particle Size of Metal (μm) | Temperature And Duration of Heating |
|---|---|---|---|---|---|
| 1 | 0.97:0.03 (x = 0.03) | Ni | 25.4 | 0.08-0.15 | 500° C./3 hr |
| 2 | 0.99:0.01 (x = 0.01) | Ni | 25.4 | 0.08-0.15 | 500° C./3 hr |
| 3 | 0.96:0.04 (x = 0.04) | Cu | 25.4 | 0.5-1.3 | 475° C./7 hr |
| 4 | 0.99:0.01 (x = 0.01) | Cu | 25.4 | 0.5-1.3 | 475° C./7 hr |
| 5 | 0.97:0.03 (x = 0.03) | Ni | 4.6 | 0.08-0.15 | 425° C./7 hr |

The resistivity of the $Fe_{(1-x)}M_xS_{(2-2x)}$ product for each of the group samples shown in Table II was measured. These resistivites were compared to the resistivity of the corresponding unheated mixture, that is the mixture corresponding to the same molar ratio of $FeS_2$ to metal M in each of the respective groups. The resistivity measurements are summarized in Table III. The measurement of electric resistivity for the $Fe_{(1-x)}M_xS_{(2-2x)}$ material was preformed with its pellets pressed under 5000 pounds. The pellets have a weight of ~0.500 g and a diameter of 0.947 cm. An AC power source of a Quadtech 7400 LCR meter was used to measure the impedance of the pellets at the frequency of 2.5 kHZ. The resistivity was calculated with the following equation and is presented in Table III.

$$Resistivity(ohm\text{-}cm) = \frac{AC\ impedance(ohm) \times area\ of\ pellets(cm^2)}{Thickness\ of\ pellets(cm)}$$

As shown in Table III the heating of the $FeS_2$ and metal mixtures (see, Table II for heating temperatures) results in a crystalline product $Fe_{(1-x)}M_xS_{(2-2x)}$ with much lower electrical resistivity than the unheated simple mixtures of $FeS_2$ and metal (Ni or Cu) in corresponding same mole ratios.

TABLE III

Electric Resistivity of Heated and Un-Heated Mixtures of
$FeS_2$ and Metal at Specific Molar Ratios

| Sample Group No. | | Electric Resistivity (ohm-cm) |
|---|---|---|
| 1 | $FeS_2$ + Ni (molar ratio $FeS_2$:Ni 0.97:0.03) unheated | 8.03 |
| 1 | $FeS_2$ + Ni (molar ratio $FeS_2$:Ni 0.97:0.03) heated at 500° C. for 3 hours producing metal doped iron sulfide $Fe_{0.97}Ni_{0.03}S_{1.94}$ | 0.25 |
| 2 | $FeS_2$ + Ni (molar ratio $FeS_2$:Ni 0.99:0.01)-unheated | 8.79 |
| 2 | $FeS_2$ + Ni (molar ratio $FeS_2$:Ni 0.99:0.01) heated at 500° C. for 3 hours producing metal doped iron sulfide $Fe_{0.99}Ni_{0.01}S_{1.98}$ | 0.85 |
| 3 | $FeS_2$ + Cu (molar ratio $FeS_2$:Cu 0.96:0.04)-unheated | 6.79 |
| 3 | $FeS_2$ + Cu (molar ratio $FeS_2$:Cu 0.96:0.04) heated at 475° C. for 7 hours producing metal doped iron Sulfide $Fe_{0.96}Cu_{0.04}S_{1.92}$ | 0.38 |
| 4 | $FeS_2$ + Cu (molar ratio $FeS_2$:Cu 0.99:0.01) - unheated | 7.45 |
| 4 | $FeS_2$ + Cu (molar ratio $FeS_2$:Cu 0.99:0.01) heated at 475° C. for 7 hours producing metal doped iron sulfide $Fe_{0.99}Cu_{0.01}S_{1.98}$ | 1.43 |
| 5 | $FeS_2$ + Ni (molar ratio $FeS_2$:Ni 0.97:0.03) -- unheated | 4.45 |
| 5. | $FeS_2$ + Ni (molar ratio $FeS_2$:Ni 0.97:0.03) heated at 425° C. for 7 hours producing metal doped iron sulfide $Fe_{0.97}Ni_{0.03}S_{1.94}$ | 2.53 |

Theoretical Considerations

Metal sulfides such as $NiS_2$, $CuS_2$, $CoS_2$, $MnS_2$, and $ZnS_2$ all possess a crystal structure similar to that of pyrite $FeS_2$. All these sulfides can be viewed, at least to some extent, as semiconductor materials based on their room temperature electric conductivity. A semiconductor is a material with narrow energy gap between a filled valence band and an empty conduction band. At ambient temperature some electrons in the valence band are thermally excited to the conduction band, enough to give the material an electric conductivity between that of metal and that of insulator. The conductivity of a semiconductor is proportional to the number of electrons in the conduction band, which is in turn proportional to the Boltzmann factor $e^{-E_g/RT}$, wherein $E_g$ is the energy gap. Consequently, the conductivity of a semiconductor increases as the energy gap, Eg is reduced. (See, W. L. Jolly, Modern Inorganic Chemistry, McGraw-Hill, Inc. (1984), p. 316.)

The cathode active material $Fe_{(1-x)}M_xS_{(2-2x)}$, which is the product of the invention, may also be considered a semiconductor material. It is believed that the replacement of Fe in the $FeS_2$ crystal structure with a metal M, e.g. nickel or copper, reduces the energy gap between the valence band and the conduction band. It is theorized that the $Fe_{(1-x)}M_xS_{(2-2x)}$ material, 0.1>x>0.01, has a defect crystal lattice where there is a deficiency in sulfur atoms S ($S_{2-2x}$ instead of $S_2$.) The deficiency in sulfur atoms creates vacancies in the crystalline structure which are occupied by electrons. It is theorized that these electrons are excited to the conduction band with lower energy gap and results in better conductivity (lower resistivity) of the $Fe_{(1-x)}M_xS_{(2-2x)}$ crystalline material compared to unheated mixtures of $FeS_2$ and metal M. The reduction in resistivity of the $Fe_{(1-x)}M_xS_{(2-2x)}$ product is very significant as may be seen from the comparison in Table III.

Test Cell Vs. Comparative Cell Performance

Five test cells (ASTM size 2032 coin cells 100) were made as above described. The lithium anode, separator, and electrolyte were the same for all the cells. The electrolyte was composed of $Li(CF_3SO_2)_2N$ (LiTFSI) dissolved in a solvent mixture comprising 1,3-dioxolane (DX), 80 vol % and sulfolane (SL), 20 vol. %, with 1 wt. % pyridine added. The electrolyte was of the type disclosed in commonly assigned International Application WO2008/012776 A2. The cathode coating was the same and prepared in the same manner from a dried cathode slurry coated on an aluminum substrate as above described, except for the cathode active material. The cathode active material in the test cells was a metal doped iron sulfide $Fe_{(1-x)}M_xS_{(2-2x)}$ made by heating mixtures of $FeS_2$ and small amount of metal selected from nickel (Ni) as given in Group 5, Table II. The molar ratio of $FeS_2$ to Ni was 0.97:0.03.

Five Comparative Coin Cells (ASTM size 2032 coin cell 100) were prepared with same lithium anode, separator, and electrolyte as above described for Group 5, Table II except that the cathodes employed only $FeS_2$ as the cathode active material. The same weight of $Fe_{(1-x)}M_xS_{(2-2x)}$ product, namely 0.023 g, was present in the cathode for each of the test cells. And the same weight, namely 0.023 g of $FeS_2$, was employed for the cathode active material in the comparative cells.

The Test Cells and Comparative Cells were subjected to the DIGICAM Test.

Before the DIGICAM test was applied, however, all the fresh cells (Test Cells and Comparative Cells) were first predischarged to consume 3 percent of the cell's capacity. After predischarge the cells were then stored for 24 hours at ambient room temperature (21° C.). The DIGICAM test protocol is as follows:

The digital camera test (DIGICAM test) consists of the following pulse test protocol wherein each test cell was drained by applying pulsed discharge cycles to the cell: Each cycle consists of both a 6.5 milliwatt pulse for 2 seconds followed immediately by a 2.82 milliwatt pulse for 28 seconds. After every 10 cycles the cells are allowed to rest for 55 minutes and the cycles repeated. The cycles are continued until a cutoff voltage of 1.05V is reached. The number of pulsed cycles required to reach these cutoff voltages were recorded.

The discharge performance of the test cells and comparative cells is summarized in Table IV.

TABLE IV

Performance (DIGICAM Test) for Lithium Test Coin Cells[1]
Employing $Fe_{0.97}Ni_{0.03}S_{1.94}$ Cathode Material Compared to Same Cells Employing $FeS_2$ Cathode Material

| Cell No. | No. of Pulsed Cycles For Li/ $Fe_{0.97}Ni_{0.03}S_{1.94}$ Test Coin Cells[2] to 1.05 V Cutoff | No. of Pulsed Cycles[3] for Li/$FeS_2$ Comparative Coin Cells to 1.05 V Cutoff |
|---|---|---|
| 1 | 681 | 641 |
| 2 | 721 | 661 |
| 3 | 671 | 600 |
| 4 | 621 | 641 |
| 5 | 701 | 541 |
| Average | 679 | 617 |

Notes:
[1] The cells were ASTM size 2032 lithium coin cells having an overall diameter of about 20 mm and a thickness of about 3 mm. The electrolyte used in all the cells was composed of $Li(CF_3SO_2)_2N$ (LiTFSI) 0.8 mol/liter dissolved in a solvent mixture comprising 1,3-dioxolane (DX), 80 vol % and sulfolane (SL), 20 vol. %, with 0.1 wt. % pyridine added.
[2] Molar ratio of $FeS_2$ to M (Ni) used to produce the metal doped iron sulfide product $Fe_{(1-x)}M_xS_{(2-2x)}$ in the test cells is 0.97:0.03 (No. 5, Table II). The comparative cell for NO. 5, Table II employed only $FeS_2$ as cathode active material.
[3] Each pulsed cycle consists of both a 6.5 milliWatt pulse for 2 seconds followed immediately by a 2.82 milliWatt pulse for 28 seconds. After every 10 cycles the cells were allowed to rest for 55 minutes and the protocol repeated until the cutoff voltage of 1.05 V was reached.

It is evident from the test data presented in Table IV that the lithium cells with cathodes containing the Ni doped iron sulfide product of the invention produced more pulsed cycles on the DIGICAM test than the same size lithium cells with $FeS_2$ cathode material.

Additionally, discharge tests were performed comparing the voltage vs. time discharge profile of a lithium coin cell utilizing the Group 1 cathode active material utilizing the nickel doped iron sulfide of the invention compared to a comparative cell utilizing a simple unheated mixture of the same components used in making the nickel doped iron sulfide. That is, the test cell had the cathode active material made by heating a reaction mixture of $FeS_2$ and nickel in mole ratio of 0.97:0.03 at 500° C. for 3 hours in an argon atmosphere as above described. This resulted in a cathode active material of formula $Fe_{(1-x)}Ni_xS_{(2-2x)}$ with x=0.03, namely $Fe_{0.97}Ni_{0.03}S_{1.94}$. By contrast the test cell utilized cathode active material in same amount, but the cathode active material was instead formed of a simple (unheated) mixture of $FeS_2$ and nickel in mole ratio 0.97:0.03. The cells were otherwise the same and contained the same electrolyte, namely, $Li(CF_3SO_2)_2N$ (LiTFSI) dissolved in a solvent mixture comprising 80 vol % 1,3-dioxolane (DX), 20 vol % sulfolane (SL), with 1 wt. % pyridine added. The cells were discharged at a constant rate of 100 mA per gram of cathode active material to a cutoff voltage of 0.6 volt. The discharge voltage for the test cell was higher than the discharge voltage for the comparative cell throughout the entire discharge time profile. This indicated that the test cells with the nickel doped iron sulfide cathode active material had better rate capability than the comparative cell with $FeS_2$ and nickel in simple mixture in the cathode.

Although the invention has been described with reference to specific embodiments, it should be appreciated that other embodiments are possible without departing from the concept of the invention and are thus within the claims and equivalents thereof.

What is claimed is:

1. A primary electrochemical cell comprising a housing; a positive and a negative terminal; an anode comprising at least one of a lithium metal and lithium alloy; a cathode comprising a metal doped iron sulfide and conductive carbon; wherein said metal doped iron sulfide has a crystalline structure having a metal M incorporated therein, wherein said metal doped iron sulfide has the formula Fe(1-x)MxS(2-2x), wherein x has a value between 0.01 and 0.1 or equal to 0.01 or 0.1, wherein the metal M is selected from the group consisting of nickel, copper, iron, and manganese.

2. A primary electrochemical cell comprising a housing; a positive and a negative terminal; an anode comprising at least one of a lithium metal and lithium alloy; a cathode comprising a metal doped iron sulfide and conductive carbon; wherein said metal doped iron sulfide has a crystalline structure having a metal M incorporated therein, wherein said metal doped iron sulfide has the formula $Fe_{(1-x)}M_xS_{(2-2x)}$, wherein x has a value between 0.01 and 0.1 or equal to 0.01 or 0.1, wherein the metal M is selected from the group consisting of nickel and copper.

3. The cell of claim 2 wherein the metal M consists of nickel.

4. The cell of claim 2 wherein the metal M consists of copper.

5. The cell of claim 2 wherein said metal doped iron sulfide has a resistivity between about 0.25 and 2.5 ohm-cm.

6. The cell of claim 2 wherein said metal M is held chemically bonded within said crystalline structure.

7. The cell of claim 2 wherein said metal doped iron sulfide has a particle size between about 1 and 100 micron.

8. The cell of claim 2 wherein said metal doped iron sulfide has a particle size between about 10 and 50 micron.

9. The cell of claim 2 further comprising an electrolyte comprising a lithium salt comprising bistrifluoromethylsulfonyl imide ($Li(CF_3SO_2)_2N$) dissolved in a solvent mixture comprising 1,3-dioxolane and sulfolane.

10. The cell of claim 9 wherein said solvent mixture comprises between about 70 and 90 volume percent 1,3-dioxolane and between about 10 and 30 volume percent sulfolane.

11. The cell of claim 10 wherein said electrolyte further comprises between about 0.1 and 1 percent by weight pyridine.

12. The cell of claim 2 wherein said anode is in the form of a sheet.

13. The cell of claim 2 wherein said cathode comprising said metal doped iron sulfide and conductive carbon is coated onto a substrate sheet comprising aluminum.

14. The cell of claim 2 wherein said conductive carbon comprises a mixture of carbon black and graphite.

15. The cell of claim 2 wherein said cathode comprising said metal doped iron sulfide is in the form of a coating bound to a metallic substrate; wherein said anode and said cathode are arranged in spirally wound form with a separator material therebetween.

16. The cell of claim 15 wherein said separator comprises microporous polypropylene.

17. A metal doped iron sulfide having the formula $Fe_{(1-x)}M_xS_{(2-2x)}$, wherein x has a value between 0.01 and 0.1 or equal to 0.01 or 0.1, wherein the metal M is selected from the group consisting of nickel and copper, wherein said metal doped iron sulfide has a crystalline structure with the metal M held chemically bonded therein.

18. The metal doped iron sulfide of claim 17 wherein the metal M consists of nickel.

19. The metal doped iron sulfide of claim 17 wherein the metal M consists of copper.

20. The metal doped iron sulfide of claim 17 wherein said metal doped iron sulfide has a resistivity between about 0.25 and 2.5 ohm-cm.

21. The metal doped iron sulfide of claim 17 wherein said metal doped iron sulfide has a particle size between about 1 and 100 micron.

22. The metal doped iron sulfide of claim 17 wherein said metal doped iron sulfide has a particle size between about 10 and 50 micron.

23. A method of producing a metal doped iron sulfide comprising the steps of:
  a) preparing a reaction mixture comprising iron disulfide ($FeS_2$) powder and metal (M) powder mixture, wherein the mole fraction of metal (M) in the iron disulfide ($FeS_2$) and metal (M) mixture is between 0.01 and 0.1, or equal to 0.01 or 0.1, wherein the metal M is selected from the group consisting of nickel and copper,
  b) heating said reaction mixture in an inert atmosphere at elevated temperature between about 400 and 550° C. for at least about 1 hour, thereby forming a metal doped iron sulfide product having the formula $Fe_{(1-x)}M_xS_{(2-2x)}$, wherein x has a value between 0.01 and 0.1, or equal to 0.01 or 0.1.

24. The method of claim 23 wherein the metal M consists of nickel.

25. The method of claim 23 wherein the metal M consists of copper.

26. The method of claim 23 wherein the metal doped iron sulfide product has a crystalline structure and said metal M is held chemically bonded within said crystalline structure.

27. The method of claim 23 wherein said reaction mixture is heated to a temperature between about 425 and 500° C. in an inert atmosphere for a period between about 3 and 7 hours resulting in said metal doped iron sulfide product.

28. The method of claim 23 wherein said inert atmosphere is argon gas.

29. The method of claim 23 wherein the heating in step (b) is accomplished by maintaining said reaction mixture in a heated oven while passing argon gas therethrough thereby protecting the reaction mixture from exposure to atmospheric air.

30. The method of claim 23 wherein said metal doped iron sulfide product has a resistivity between about 0.25 and 2.5 ohm-cm.

31. The method of claim 23 wherein said metal doped iron sulfide product has an average particle size between about 1 and 100 micron.

32. The method of claim 23 wherein said metal doped iron sulfide product has an average particle size between about 10 and 50 micron.

* * * * *